United States Patent
Li et al.

(10) Patent No.: US 10,664,154 B2
(45) Date of Patent: May 26, 2020

(54) DISPLAYED CONTENT ADJUSTMENT BASED ON A RADIAN OF AN ARC

(71) Applicant: Huawei Technologies Co., Ltd., Shenzhen (CN)

(72) Inventors: Rui Li, Nanjing (CN); Zongbo Wang, Lund (SE); Guosheng Gu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 15/855,705

(22) Filed: Dec. 27, 2017

(65) Prior Publication Data

US 2018/0121079 A1    May 3, 2018

Related U.S. Application Data

(63) Continuation of application No. PCT/CN2016/091602, filed on Jul. 25, 2016.

(30) Foreign Application Priority Data

Dec. 15, 2015  (CN) .......................... 2015 1 0934338
Dec. 31, 2015  (CN) .......................... 2015 1 1031226

(51) Int. Cl.
   *G06F 3/048*   (2013.01)
   *G06F 3/041*   (2006.01)
   (Continued)

(52) U.S. Cl.
   CPC ........ *G06F 3/04883* (2013.01); *G06F 3/0488* (2013.01); *G06F 3/04847* (2013.01);
   (Continued)

(58) Field of Classification Search
   CPC . G06F 3/048; G06F 3/00; G06F 3/041; G06F 3/017
   See application file for complete search history.

(56) References Cited

U.S. PATENT DOCUMENTS 8,760,417 B2 *   6/2014   Haug .................... G06F 3/0383
                                                           345/173
9,865,250 B1 *   1/2018   Korn ....................... G10L 13/08
                        (Continued)

FOREIGN PATENT DOCUMENTS

CN       101916165 A      12/2010
CN       101989145 A       3/2011
                        (Continued)

OTHER PUBLICATIONS

Foreign Communication From a Counterpart Application, European Application No. 16874506.5, Extended European Search Report dated Aug. 10, 2018, 11 pages.
(Continued)

*Primary Examiner* — Hugo Molina
(74) *Attorney, Agent, or Firm* — Conley Rose, P.C.

(57) ABSTRACT

An operation track response method and an operation track response apparatus, where the method includes detecting a touch operation triggered by a user on a current display interface, determining a radian of an arc when a track of the touch operation includes the arc, and adjusting, according to the radian of the arc, content presented on the current display interface, where different radians correspond to adjustment of different degrees. The operation track response method and the operation track response apparatus are applicable to a touchscreen device with a small screen and media can still be controlled when an operating area is relatively small, have an extremely wide application scenario, and do not need assistance from a physical button, thereby improving practicability of the solution.

21 Claims, 6 Drawing Sheets

(51) Int. Cl.
  *G06F 3/0488* (2013.01)
  *G06F 3/0484* (2013.01)
  *G06F 3/01* (2006.01)
  *G06F 3/0481* (2013.01)
  *G06F 3/0483* (2013.01)
  *G06F 3/0485* (2013.01)
  *G11B 27/00* (2006.01)

(52) U.S. Cl.
  CPC ............ *G06F 3/017* (2013.01); *G06F 3/0483* (2013.01); *G06F 3/0485* (2013.01); *G06F 3/04817* (2013.01); *G06F 2203/04806* (2013.01); *G11B 27/005* (2013.01)

(56) References Cited

U.S. PATENT DOCUMENTS

| | | | |
|---|---|---|---|
| 2008/0084400 A1* | 4/2008 | Rosenberg | G06F 1/1626 345/173 |
| 2009/0058829 A1 | 3/2009 | Kim et al. | |
| 2009/0282454 A1* | 11/2009 | Ekstrand | H04N 21/4314 725/134 |
| 2010/0083167 A1* | 4/2010 | Kikuchi | G06F 1/1624 715/786 |
| 2010/0141684 A1 | 6/2010 | Machida | |
| 2011/0029917 A1 | 2/2011 | Um | |
| 2012/0144345 A1* | 6/2012 | Munter | G06F 3/04883 715/863 |
| 2012/0173983 A1* | 7/2012 | Song | G06F 3/0485 715/720 |
| 2014/0059489 A1* | 2/2014 | Klask | G06F 3/017 715/825 |
| 2014/0059501 A1* | 2/2014 | Yuu | G06F 3/017 715/863 |
| 2014/0111422 A1* | 4/2014 | Chow | G06F 3/0482 345/156 |
| 2014/0173529 A1* | 6/2014 | Hicks | G06F 3/04883 715/863 |
| 2014/0211047 A1* | 7/2014 | Lee | H04N 5/23216 348/240.99 |
| 2015/0026619 A1* | 1/2015 | Lee | G06F 3/0486 715/769 |
| 2015/0149967 A1* | 5/2015 | Bernstein | G06F 3/0482 715/854 |
| 2015/0301691 A1 | 10/2015 | Qin et al. | |
| 2016/0202868 A1* | 7/2016 | Parker | G06F 3/0483 715/769 |

FOREIGN PATENT DOCUMENTS

| | | |
|---|---|---|
| CN | 102609143 A | 7/2012 |
| CN | 103279352 A | 9/2013 |
| CN | 104156165 A | 11/2014 |
| CN | 104199612 A | 12/2014 |
| CN | 104679434 A | 6/2015 |
| CN | 104902335 A | 9/2015 |
| CN | 105700804 A | 6/2016 |
| EP | 2677405 A1 | 12/2013 |
| KR | 20090116591 A | 11/2009 |
| WO | 03073411 A1 | 9/2003 |

OTHER PUBLICATIONS

Machine Translation and Abstract of Chinese Publication No. CN102609143, Jul. 25, 2012, 15 pages.
Foreign Communication From a Counterpart Application, Chinese Application No. 201511031226.9, Chinese Office Action dated Dec. 12, 2018, 9 pages.
Machine Translation and Abstract of Chinese Publication No. CN104199612, Dec. 10, 2014, 31 pages.
Machine Translation and Abstract of Chinese Publication No. CN104679434, Jun. 3, 2015, 14 pages.
Machine Translation and Abstract of Chinese Publication No. CN105700804, Jun. 22, 2016, 70 pages.
Foreign Communication From a Counterpart Application, PCT Application No. PCT/CN2016/091602, English Translation of International Search Report dated Sep. 29, 2016, 2 pages.
Machine Translation and Abstract of Chinese Publication No. CN101916165, Dec. 15, 2010, 5 pages.
Machine Translation and Abstract of Chinese Publication No. CN104156165, Nov. 19, 2014, 15 pages.
Machine Translation and Abstract of Chinese Publication No. CN104902335, Sep. 9, 2015, 12 pages.
Foreign Communication From a Counterpart Application, Chinese Application No. 201511031226.9, Chinese Office Action dated Apr. 24, 2018, 8 pages.

\* cited by examiner

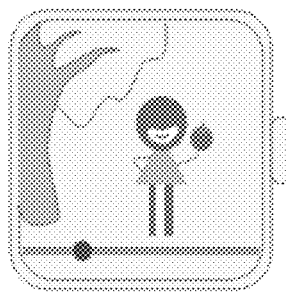 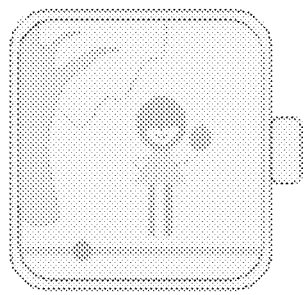 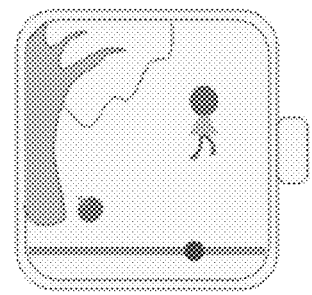
FIG. 5A  FIG. 5B  FIG. 5C
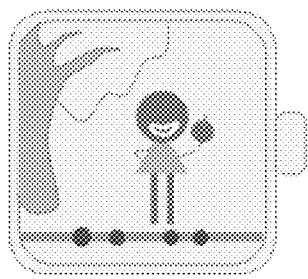 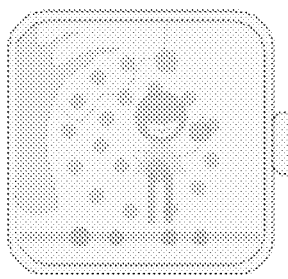 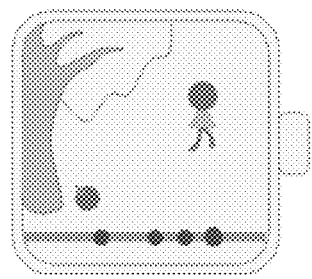
FIG. 6A  FIG. 6B  FIG. 6C
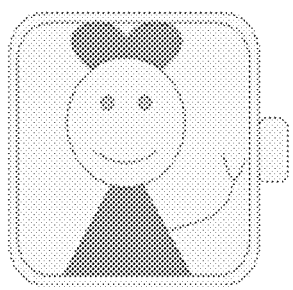 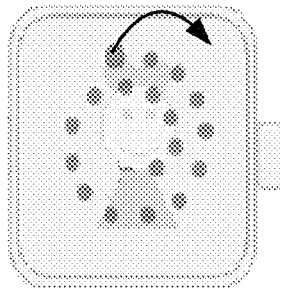 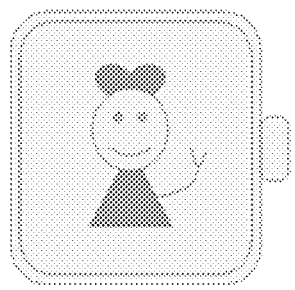
FIG. 7A  FIG. 7B  FIG. 7C

DISPLAYED CONTENT ADJUSTMENT BASED ON A RADIAN OF AN ARC

CROSS-REFERENCE TO RELATED APPLICATIONS

This application is a continuation of International Patent Application No. PCT/CN2016/091602 filed on Jul. 25, 2016, which claims priority to Chinese Patent Application No. 201511031226.9 filed on Dec. 31, 2015, and Chinese Patent Application No. 201510934338.9 filed on Dec. 15, 2015. The disclosures of the aforementioned applications are hereby incorporated by reference in their entireties.

TECHNICAL FIELD

Embodiments of the present disclosure relate to the field of communications network technologies, and in particular, to an operation track response method and an operation track response apparatus.

BACKGROUND

Currently, various touchscreen devices emerge on the market, and an operation on a touchscreen device may be classified into a gesture operation, an operation of a stylus, an operation of a physical button, and the like. The touchscreen device has a relatively wide operation scenario, for example, switching between different content pages, entering content of a specific item, presenting a content menu, and zooming of a picture. Related gesture operations are mainly classified into sliding, tapping, touching and holding, pinch-to-zoom, and the like.

In an existing touchscreen device, an operation track of a gesture operation may indicate multiple manners of controlling media. A most commonly used gesture operation may be viewing multiple pages of content by swiping on a screen, for example, swiping left or right on the screen indicating horizontal page turning, and swiping up or down on the screen indicating vertical page turning, viewing a picture by means of pinch-to-zoom, for example, stretching two fingers indicating zoom-in on the picture, and pinching of two fingers indicating zoom-out on the picture, and controlling a media playing progress by continuously sliding on a progress bar using a finger, for example, sliding forwards on the progress bar by the finger indicating fast-forward of the playing progress, and sliding backwards on the progress bar indicating rewind of the playing progress.

However, in some touchscreen devices with small screens, there is relatively large difficulty in meeting a user requirement using existing gesture operations. This is, as shown in the following aspects: 1. Because an operating area of a touchscreen device with a small screen is relatively small, there is no enough space for a multi-finger operation, for example, pinch-to-zoom. 2. An operation such as sliding with a single finger is not easy to perform on a small screen because of a relatively large path displacement. 3. It is inconvenient for fine adjustment. Sliding left or right on a progress bar likely results in excessive fast-forward or rewind, and exceeding a progress expected by a user, and therefore causes inconvenience in use.

SUMMARY

Embodiments of the present disclosure provide an operation track response method and an operation track response apparatus. In this way, media can still be controlled when an operating area is relatively small. The operation track response method and the operation track response apparatus are applicable to a touchscreen device with a small screen, have an extremely wide application scenario, and do not need assistance from a physical button, thereby improving practicability of the solutions.

In view of this, a first aspect of the embodiments of the present disclosure provides an operation track response method, including detecting, by an operation track response apparatus, a touch operation triggered by a user on a current display interface, determining, by the operation track response apparatus, a radian of an arc if the operation track response apparatus detects that a track of the touch operation is the arc, adjusting, by the operation track response apparatus according to the radian of the arc, content presented on the current display interface, where different radians correspond to adjustment of different degrees.

In this embodiment of the present disclosure, an operation track response method is provided. An operation track response apparatus detects a touch operation triggered by a user on a current display interface, determines a radian of an arc if detecting that a track of the touch operation is the arc, and adjusts, according to the radian of the arc, content presented on the current display interface, where different radians correspond to adjustment of different degrees. The touch operation triggered by the user is responded to using the foregoing method, and media can still be controlled when an operating area is relatively small. This method is applicable to a touchscreen device with a small screen, has an extremely wide application scenario, and does not need assistance from a physical button, thereby improving practicability of the solution.

With reference to the first aspect of the embodiments of the present disclosure, in a first possible implementation manner, when the content presented on the current display interface is a video or audio that is being played, adjusting, by the operation track response apparatus according to the radian of the arc, content presented on the current display interface includes adjusting, by the operation track response apparatus, a current playing progress of the video or audio according to the radian of the arc, where the playing progress includes fast-forward playing and rewind playing, and a larger radian leads to a larger degree of fast-forward or rewind.

In addition, in this embodiment of the present disclosure, for a video or audio scenario, an arc touch operation track is used to control a playing progress of a video or audio. This can help a user to perform an operation on a device with a small screen, and avoid inaccurate adjustment. In addition, a correspondence between a direction of the arc operation track and the video or audio may also be changed according to a user habit in order to improve user satisfaction and flexibility of the solution.

With reference to the first possible implementation manner of the first aspect of the embodiments of the present disclosure, in a second possible implementation manner, a progress bar of the audio or video includes multiple preset playing points, in the progress bar, a playing point closer to a playing end position corresponds to a playing time with a longer distance from a playing start position, and adjusting a current playing progress of the video or audio according to the radian of the arc includes determining, by the operation track response apparatus, a target playing point according to the radian of the arc and a preset correspondence between a radian and a playing point, and starting to play the audio or video from the target playing point, where the target playing point is one of the multiple preset playing points, and in the progress bar, a playing point closer to the playing end position corresponds to a larger radian.

In addition, in this embodiment of the present disclosure, there are playing points corresponding to an arc touch operation track, a target playing point is determined according to a radian of an arc and a preset correspondence between a radian and a playing point, and audio or a video starts to be played from the target playing point. Accordingly, this solution has a more user-friendly setting, helps a user to view content indicated by a marking point, improves user experience of the user, and improves feasibility of the solution. In addition, the user may set point information in the operation track. This action may be doing presetting during design of a software program, or may be accepting, after software is started, self-defined points set by the user. In this way, the user may not only set all points according to a preference of the user, but also add some functions of a specific point according to understandings of the user. Accordingly, flexibility of the solution is greatly improved, and user experience of the user is improved.

Optionally, with reference to the foregoing first and second possible implementation manners of the first aspect, in this embodiment, the operation track response apparatus may first calculate, according to the obtained arc corresponding to the touch operation of the user, an angular velocity corresponding to the arc. A value of the angular velocity directly affects a speed of adjusting the current playing progress of the video or audio. A larger angular velocity corresponding to the arc leads to a quicker speed of adjusting the current playing progress of the video or audio. A smaller angular velocity corresponding to the arc leads to a slower speed of adjusting the current playing progress of the video or audio.

Further, in this embodiment of the present disclosure, the arc corresponding to the touch operation input by the user is used to calculate the angular velocity corresponding to the arc, and the playing progress of the video or audio is adjusted according to the value of the angular velocity in order to improve practicability and flexibility of the solution.

Optionally, with reference to the foregoing first and second possible implementation manners of the first aspect, in this embodiment, a fine adjustment mode may be entered by means of pauses of a finger. Generally, there are some differences in a display screen that enters the fine adjustment mode. For example, a background of the screen darkens or a background of the screen blurs. In this case, the user continues to slide on the touchscreen with an arc to adjust the progress of the video or audio in order to perform a corresponding fine adjustment operation. In the fine adjustment mode, the progress bar is split according to a finer granularity. For example, in a normal adjustment mode, an adjustment granularity is per 5 seconds, and in the fine adjustment mode, an adjustment granularity is per 1 second. The user may slowly adjust the progress until a finger departs. The video or audio continues to be played.

Further, in this embodiment of the present disclosure, an operation of finely adjusting and playing the video or audio is provided. In many cases, for a specific video or audio segment, if a progress is directly dramatically adjusted, a required segment may be missed. This is inconvenient for control in detail. However, after the fine adjustment operation is added, the user may first roughly determine a position at which the play segment is located in the progress bar, and then uses a fine adjustment gesture to enter a fine adjustment state to find a specific position at which the segment is located such that practicability and feasibility of the solution are improved.

With reference to the first aspect of the embodiments of the present disclosure, in a third possible implementation manner, when the content presented on the current display interface is a single picture, adjusting, according to the radian of the arc, content presented on the current display interface includes zooming in, by the operation track response apparatus, on the single picture according to the radian of the arc when a direction corresponding to the track of the touch operation is a first direction, or zooming out, by the operation track response apparatus, on the single picture according to the radian of the arc when a direction corresponding to the track of the touch operation is a second direction, where the first direction is one of a clockwise direction or an anti-clockwise direction, and the second direction is the other of the clockwise direction or the anti-clockwise direction.

In addition, in this embodiment of the present disclosure, an operation of controlling a picture size that is applied to a single-picture scenario is provided. When a direction corresponding to a track of a touch operation is a first direction, a zoom-in operation is performed on a single picture according to a radian of an arc, or when a direction corresponding to a track of a touch operation is a second direction, a zoom-out operation is performed on the single picture according to a radian of an arc, where the first direction is one of a clockwise direction or an anti-clockwise direction, and the second direction is the other of the clockwise direction or the anti-clockwise direction. In this way, a user can adjust a display size of the picture simply in a manner of sliding with an arc on a relatively small screen. This does not cause an inaccurate operation because of an extremely small screen such that user experience is better.

With reference to the third possible implementation manner of the first aspect of the embodiments of the present disclosure, in a fourth possible implementation manner, adjusting, according to the radian of the arc, content presented on the current display interface includes performing a zoom-out or zoom-in operation on the single picture according to the radian of the arc and a preset correspondence between a radian and a zoom percentage of the single picture, where a larger radian of the arc corresponds to a smaller zoom-out percentage or a larger zoom-in percentage of the single picture.

In this embodiment of the present disclosure, a zoom operation may be performed on a single picture. This can help a user to perform a zoom-in or zoom-out operation on the picture on a small screen. In addition, the operation track response apparatus can directly zoom in on or zoom out on the picture to ideal times according to a user requirement, instead of gradually adjusting a display size of the picture, which is more practicable.

Optionally, with reference to the foregoing third and fourth possible implementation manners of the first aspect, in this embodiment, the single picture includes multiple preset zoom points, different zoom points correspond to different zoom percentages, and adjusting, according to the radian of the arc, content presented on the current display interface includes determining, by the operation track response apparatus, a target zoom point according to the radian of the arc and a preset correspondence between a radian and a zoom point, and starting to zoom out on or zoom in on the corresponding zoom picture from the target zoom point, where the target zoom point is one of the multiple preset zoom points, and a larger radian of the arc corresponds to a larger zoom-out or zoom-in percentage of the picture.

Further, in this embodiment of the present disclosure, a zoom operation may be performed on the picture by setting multiple zoom points in the single picture. This can help a user to perform a zoom-in or zoom-out operation on the picture on a small screen. In addition, the operation track response apparatus can directly zoom in on or zoom out on the picture to ideal times according to a user requirement, instead of gradually adjusting a display size of the picture, which is more practicable.

Optionally, with reference to the foregoing third and fourth possible implementation manners of the first aspect, in this embodiment, adjusting a display size of the single picture according to the radian of the arc may include first obtaining an angular velocity corresponding to the radian of the arc. There is a preset correspondence between the angular velocity and a speed of adjusting a display size of the single picture. A larger angular velocity corresponding to the radian of the arc leads to a quicker speed of adjusting the display size of the single picture. A smaller angular velocity corresponding to the radian of the arc leads to a slower speed of adjusting the display size of the single picture.

Further, in this embodiment of the present disclosure, for a scenario in which the display size of the single picture is adjusted, a relationship between the angular velocity corresponding to the touch track triggered by the user and a display size of the single picture is set. In this way, a display size of a picture may be adjusted more quickly or slowly, it is convenient for viewing, and feasibility and practicability of the solution are improved.

Optionally, with reference to the foregoing third and fourth possible implementation manners of the first aspect, in this embodiment, a fine adjustment mode may be entered by means of pauses of a finger. After the fine adjustment mode is entered, a degree of zooming in on and zooming out on the picture is relatively small. For example, originally, an original picture may be adjusted to 2 times, 4 times, or 8 times as large as the original picture. After the fine adjustment mode is entered, an original picture may be adjusted to 1.1 times, 1.2 times, 1.3 times, 1.4 times, or the like as large as the original picture to help the user to view.

Further, in this embodiment of the present disclosure, an operation of finely adjusting and displaying the single picture is provided. In many cases, the user considers that zooming in on the picture by two times enables the picture to be seemingly oversized. Therefore, after the fine adjustment operation is added, a picture size with which the user is more satisfied may be obtained. User experience is not affected by zooming in on the picture to an oversized picture or zooming out on the picture to an undersized picture, and practicability and feasibility of the solution are improved.

Optionally, with reference to the foregoing third and fourth possible implementation manners of the first aspect, in this embodiment, if an upper limit of zooming in on a picture is 16 times, when the user slides on a touchscreen with an arc to zoom in on the picture to 16 times, if the user continues to slide on the touchscreen in this direction, a next picture is to be displayed. Certainly, an upper limit of zooming out on a picture is one-sixteenth time. When the user slides on the touchscreen with an arc to zoom out on the picture to one-sixteenth time, if the user continues to slide on the touchscreen in this direction, a previous picture is to be displayed.

Further, in this embodiment of the present disclosure, when the user slides on the touchscreen with an arc to zoom in the picture to a maximum time or zoom out the picture to a minimum time, the next picture or the previous picture is to be adjusted by consecutively sliding. In this way, flexibility and operability of the solution are improved, and an operation responding to each gesture of the user may also be effectively used such that practicability of the solution and usage efficiency of the solution are improved.

With reference to the first aspect of the embodiments of the present disclosure, in a fifth possible implementation manner, when the content presented on the current display interface is one of multiple pictures, adjusting, according to the radian of the arc, content presented on the current display interface includes switching, by the operation track response apparatus, the current picture to a previous picture according to the radian of the arc when a direction corresponding to the track of the touch operation is a first direction, where the first direction is a clockwise direction or an anti-clockwise direction, or switching, by the operation track response apparatus, the current picture to a next picture according to the radian of the arc when a direction corresponding to the track of the touch operation is a second direction, where the second direction is a direction other than a first direction in a clockwise direction or an anti-clockwise direction.

In addition, in this embodiment of the present disclosure, an operation of controlling picture switching that is applied to a multiple-picture scenario is provided. When a direction corresponding to a track of a touch operation is a first direction, a current picture is switched to a previous picture according to a radian of an arc, where the first direction is a clockwise direction or an anti-clockwise direction, or when a direction corresponding to a track of a touch operation is a second direction, a current picture is switched to a next picture according to a radian of an arc, where the second direction is a direction other than the first direction in a clockwise direction or an anti-clockwise direction. In this way, a defect of inconvenience of switching pictures on a small screen is fixed, and flexibility and practicability of the solution are improved.

Optionally, with reference to the foregoing fifth possible implementation manner of the first aspect, in this embodiment, for a multiple-picture scenario, a picture switching speed may be determined according to an angular velocity corresponding to the touch track triggered by the user. Because the touch track triggered by the user is an arc, the angular velocity obtained by calculating according to the radian of the arc and a time taken by the operation has a correspondence with the picture switching speed.

A larger angular velocity corresponding to the radian of the arc leads to a quicker speed of switching each picture in the multiple pictures. A smaller angular velocity corresponding to the radian of the arc leads to a slower speed of switching each picture in the multiple pictures.

Further, in this embodiment of the present disclosure, the multiple pictures are switched according to a correspondence between the angular velocity and the picture switching speed. In this way, efficiency in picture switching can be improved. In addition, when it is inconvenient for the user to view pictures one by one, the user may quickly slide on the touchscreen with an arc to select a picture required by the user and cover other content that the user does not want another person to see in order to better protect privacy of the user, and improve feasibility and practicability of the solution.

With reference to the first aspect of the embodiments of the present disclosure, in a sixth possible implementation manner, when the content presented on the current display interface is one of multiple pictures, adjusting, according to the radian of the arc, content presented on the current display interface includes determining, by the operation track response apparatus according to the radian of the arc and a preset correspondence between a radian and a quantity of switched pictures, a target display picture obtained by switching, and displaying the target display picture in the multiple pictures, where the target display picture is one of the multiple pictures, and a larger radian of the arc leads to a larger quantity of switched pictures.

In addition, in this embodiment of the present disclosure, when there are a relatively large quantity of pictures, and a penultimate picture in all pictures needs to be found, more pictures may be rapidly switched if a radian of an arc corresponding to a track of a touch operation is simply enlarged. In one aspect, a time of selecting a required picture from multiple pictures by a user can be reduced, and application efficiency of the solution can be improved. In another aspect, flexibility of the solution can be improved such that the solution is more practicable.

With reference to the first aspect of the embodiments of the present disclosure, in a seventh possible implementation manner, when the content presented on the current display interface is multiple levels of folders, adjusting, according to the radian of the arc, content presented on the current display interface includes switching, by the operation track response apparatus, a current folder to a previous-level folder according to the radian of the arc when a direction corresponding to the track of the touch operation is a first direction, where the first direction is a clockwise direction or an anti-clockwise direction, and in the multiple folders, a folder closer to a root directory corresponds to a larger radian of the arc.

In addition, in this embodiment of the present disclosure, in a scenario of multiple levels of folders, the used operation track response method is as follows. When a direction corresponding to a track of a touch operation is a first direction, a current folder is switched to a previous-level folder according to a radian of an arc, where the first direction is a clockwise direction or an anti-clockwise direction, and in the multiple folders, a folder closer to a root directory corresponds to a larger radian of the arc. Accordingly, a folder required by a user is flexibly switched to in the scenario of multiple levels of folders, and practicability and flexibility of the solution are greatly improved.

Optionally, with reference to the foregoing seventh possible implementation manner of the first aspect, in this embodiment, in a scenario of multiple levels of folders, if the presented content is multiple levels of folders, when the direction corresponding to the track of the touch operation is the first direction, the current folder may be switched to the previous-level folder according to the radian of the arc. For example, a folder A includes a sub-folder A1, a sub-folder A2, and a sub-folder A3. When the touch operation track of the user is clockwise, the current folder, the sub-folder A2, may be switched to the folder A according to the radian of the arc. The first direction may be a clockwise direction or may be an anti-clockwise direction, and in the multiple folders, a folder closer to a root directory corresponds to a larger radian of the arc.

In this way, if reverse switching needs to be performed, a folder path needs to be preset. For example, a folder A includes a sub-folder A1, a sub-folder A2, and a sub-folder A3. The sub-folder A1 includes a folder a, a folder b, and a folder c. The preset folder path may be as follows: the folder A corresponds to the sub-folder A1, and the sub-folder A1 corresponds to the folder c. In this way, when sliding in the second direction on the folder A, the user first finds the sub-folder A1, and then finds the folder c. The second direction is a reverse direction of the first direction.

Further, in this embodiment of the present disclosure, in the scenario of multiple levels of folders, in addition to switching to the previous-level folder, the next-level folder may be found according to a preset folder path. A folder path is added to resolve a problem in which a corresponding next-level folder in tree-like folders cannot be easily found. A problem in a case in which one folder corresponds to multiple sub-folders is also resolved such that practicability and feasibility of the solution are improved, and operation experience of the user is greatly improved.

With reference to the first aspect of the embodiments of the present disclosure, in an eighth possible implementation manner, when the content presented on the current display interface is a single page, adjusting, according to the radian of the arc, content presented on the current display interface includes scrolling down, by the operation track response apparatus, the page according to the radian of the arc when a direction corresponding to the track of the touch operation is a first direction, where the first direction is a clockwise direction or an anti-clockwise direction, and in the page, a position closer to the bottom of the page corresponds to a larger radian of the arc, or scrolling up, by the operation track response apparatus, the page according to the radian of the arc when a direction corresponding to the track of the touch operation is a second direction, where the second direction is a direction other than a first direction in a clockwise direction or an anti-clockwise direction.

In addition, in this embodiment of the present disclosure, for a single-page scenario, a page may be scrolled using a track of a touch operation. The page may be easily scrolled on a small screen. In addition, it helps the user to view content desired by the user. This may be implemented using a simple clockwise or anti-clockwise touch track in order to improve feasibility of the solution.

Optionally, with reference to the foregoing eighth possible implementation manner of the first aspect, in this embodiment, in the single-page scenario, a page scrolling speed is determined according to an angular velocity corresponding to the touch track triggered by the user. There is a specific correspondence between the angular velocity and the page scrolling speed. The correspondence may be pre-stored in the operation track response apparatus.

A larger velocity corresponding to the radian of the arc leads to a quicker scrolling speed for adjusting the single page by the operation track response apparatus. Conversely, a smaller velocity corresponding to the radian of the arc leads to a slower scrolling speed for adjusting the single page.

Further, in this embodiment of the present disclosure, in the single-page scenario, the page scrolling speed may be determined according to the angular velocity corresponding to the touch track triggered by the user. If a text required by the user is at the bottom of the page, the bottom of the page may be more quickly entered in such a manner such that the user more quickly and effectively obtains content required by the user, and feasibility and practicability of the solution are improved.

With reference to the first aspect of the embodiments of the present disclosure, in a ninth possible implementation manner, when the content presented on the current display interface is multiple pages, adjusting, according to the radian of the arc, content presented on the current display interface includes switching, by the operation track response apparatus, a current page to a previous page according to the radian of the arc when a direction corresponding to the track of the touch operation is a first direction, where the first direction is a clockwise direction or an anti-clockwise direction, and a larger radian of the arc leads to a larger quantity of switched pages, or switching, by the operation track response apparatus, a current page to a next page according to the radian of the arc when a direction corresponding to the track of the touch operation is a second direction, where the second direction is a direction other than a first direction in a clockwise direction or an anti-clockwise direction.

In addition, in this embodiment of the present disclosure, in a case of multiple pages, for example, for an e-book, internal content may be viewed in a page turning manner. Page switching is particularly commonly used in a scenario of a relatively large quantity of pages, and for a single page, page scrolling is performed. Therefore, in this embodiment, practicability and operability of the solution are improved.

Optionally, with reference to the foregoing ninth possible implementation manner of the first aspect, in this embodiment, for a scenario in which switching is performed among multiple pages, adjustment may be performed still according to an angular velocity corresponding to the operation track of the user, and there is a correspondence between the angular velocity corresponding to the operation track and a page switching speed. A larger velocity corresponding to the radian of the arc leads to a quicker speed of controlling switching of the multiple pages. A smaller velocity corresponding to the radian of the arc leads to a slower speed of controlling switching of the multiple pages.

Further, in this embodiment of the present disclosure, in the scenario in which switching is performed among the multiple pages, the used operation track response method is as follows. Adjustment is performed according to the angular velocity corresponding to the operation track. In addition, there is also a correspondence between the angular velocity corresponding to the operation track and the page switching speed in order to find a page required by the user. Accordingly, a page required by the user is flexibly switched to in the multiple-page scenario, and practicability and flexibility of the solution are greatly improved.

Optionally, with reference to the foregoing implementation manners corresponding to the first aspect, in this embodiment, in a date-time setting scenario, when the user slides clockwise on the touchscreen with an arc, the date-time is adjusted forwards, or when an arc is obtained by sliding in an anti-clockwise direction, the date-time is adjusted backwards. It should be noted that operations corresponding to the clockwise sliding and the anti-clockwise sliding may also be adjusting the date-time backwards when the user slides clockwise on the touchscreen with an arc, or adjusting the date-time forwards. Therefore, this is not limited herein when an arc is obtained by sliding in an anti-clockwise direction.

However, a quicker angular velocity of an arc corresponding to the operation track of the user leads to a quicker operation speed of forward adjustment or a quicker operation speed of backward adjustment, and a slower angular velocity of an arc corresponding to the operation track of the user leads to a slower operation speed of forward adjustment or a slower operation speed of backward adjustment.

When a finger of the user pauses in a setting process, a fine adjustment mode may be entered. Focuses are sequentially downgraded, that is, year, month, day, hour, minute, second are sequentially focused on, and a second-based adjustment mode is finally entered. When the finger departs, the fine adjustment mode is disabled.

Optionally, with reference to the foregoing implementation manners corresponding to the first aspect, in this embodiment, in a volume adjustment scenario, when sliding clockwise on the touchscreen, the user may turn up volume, and when sliding anti-clockwise on the touchscreen, may turn down the volume.

If the user quickly slides on the touchscreen, it is determined that, currently, the user may consider that volume is too high or low. A system automatically locates the volume at an appropriate point, and the volume corresponding to the appropriate point may be volume obtained by adjusting by most users and may be obtained using a big data technology. Moreover, automatic matching may be performed for a user device (UD) according to ambient noise, and a sound of the UD is amplified or reduced to the most appropriate volume specific to current noise. After adjusting the volume to a target volume, generally, the user further performs reverse adjustment. For example, when the user considers that the sound is too low, and wants to continue to adjust the sound to a higher volume, the user generally first adjusts the sound to a relatively high volume, and then adjusts the sound to a lower volume. Then, the UD automatically enters a fine adjustment mode such that the user adjusts the sound to a most appropriate volume.

A second aspect of the embodiments of the present disclosure provides an operation track response apparatus, including a detection module configured to detect a touch operation triggered by a user on a current display interface, a determining module configured to determine a radian of the arc if the detection module detects that a track of the touch operation is an arc, and an adjustment module configured to adjust, according to the radian that is of the arc and is determined by the determining module, content presented on the current display interface, where different radians correspond to adjustment of different degrees.

With reference to the second aspect of the embodiments of the present disclosure, in a first possible implementation manner, when the content presented on the current display interface is a video or audio that is being played, the adjustment module includes a video or audio adjustment unit configured to adjust a current playing progress of the video or audio according to the radian that is of the arc and is determined by the determining module, where the playing progress includes fast-forward playing and rewind playing, and a larger radian leads to a larger degree of fast-forward or rewind.

With reference to the first possible implementation manner of the second aspect of the embodiments of the present disclosure, in a second possible implementation manner, a progress bar of the audio or video includes multiple preset playing points, in the progress bar, a playing point closer to a playing end position corresponds to a playing time with a longer distance from a playing start position, and the video or audio adjustment unit includes a video or audio playing subunit configured to determine a target playing point according to the radian that is of the arc and is determined by the determining module and a preset correspondence between a radian and a playing point, and start to play the audio or video from the target playing point, where the target playing point is one of the multiple preset playing points, and in the progress bar, a playing point closer to the playing end position corresponds to a larger radian.

With reference to the second aspect of the embodiments of the present disclosure, in a third possible implementation manner, when the content presented on the current display interface is a single picture, the adjustment module includes a first single-picture adjustment unit configured to zoom in on the single picture according to the radian of the arc when a direction that corresponds to the track of the touch operation and is determined by the determining module is a first direction, and a second single-picture adjustment unit configured to zoom out on the single picture according to the radian of the arc when a direction that corresponds to the track of the touch operation and is determined by the determining module is a second direction, where the first direction is one of a clockwise direction or an anti-clockwise direction, and the second direction is the other of the clockwise direction or the anti-clockwise direction.

With reference to the third possible implementation manner of the second aspect of the embodiments of the present disclosure, in a fourth possible implementation manner, the single picture includes multiple preset zoom points, different zoom points correspond to different zoom percentages, and the adjustment module includes a picture zoom unit configured to determine a target zoom point according to the radian of the arc and a preset correspondence between a radian and a zoom point, and start to zoom out on or zoom in on the corresponding zoom picture from the target zoom point, where the target zoom point is one of the multiple preset zoom points, and a larger radian of the arc corresponds to a larger zoom-out or zoom-in percentage of the picture.

With reference to the second aspect of the embodiments of the present disclosure, in a fifth possible implementation manner, when the content presented on the current display interface is one of multiple pictures, the adjustment module includes a first multiple-picture adjustment unit configured to switch the current picture to a previous picture according to the radian of the arc when a direction that corresponds to the track of the touch operation and is determined by the determining module is a first direction, where the first direction is a clockwise direction or an anti-clockwise direction, or a second multiple-picture adjustment unit configured to switch the current picture to a next picture according to the radian of the arc when a direction that corresponds to the track of the touch operation and is determined by the determining module is a second direction, where the second direction is a direction other than a first direction in a clockwise direction or an anti-clockwise direction.

With reference to the second aspect of the embodiments of the present disclosure, in a sixth possible implementation manner, when the content presented on the current display interface is one of multiple pictures, the adjustment module includes a multiple-picture switching unit configured to determine, according to the radian that is of the arc and is determined by the determining module and a preset correspondence between a radian and a quantity of switched pictures, a target display picture obtained by switching, and display the target display picture in the multiple pictures, where the target display picture is one of the multiple pictures, and a larger radian of the arc leads to a larger quantity of switched pictures.

With reference to the second aspect of the embodiments of the present disclosure, in a seventh possible implementation manner, when the content presented on the current display interface is multiple levels of folders, the adjustment module includes a folder switching unit configured to switch a current folder to a previous-level folder according to the radian of the arc when a direction that corresponds to the track of the touch operation and is determined by the determining module is a first direction, where the first direction is a clockwise direction or an anti-clockwise direction, and in the multiple folders, a folder closer to a root directory corresponds to a larger radian of the arc.

With reference to the second aspect of the embodiments of the present disclosure, in an eighth possible implementation manner, when the content presented on the current display interface is a single page, the adjustment module includes a page scrolling-down unit configured to scroll down the page according to the radian of the arc when a direction that corresponds to the track of the touch operation and is determined by the determining module is a first direction, where the first direction is a clockwise direction or an anti-clockwise direction, and in the page, a position closer to the bottom of the page corresponds to a larger radian of the arc, or a page scrolling-up unit configured to scroll up the page according to the radian of the arc when a direction that corresponds to the track of the touch operation and is determined by the determining module is a second direction, where the second direction is a direction other than a first direction in a clockwise direction or an anti-clockwise direction.

With reference to the second aspect of the embodiments of the present disclosure, in a ninth possible implementation manner, when the content presented on the current display interface is multiple pages, the adjustment module includes a page switching-up unit configured to switch a current page to a previous page according to the radian of the arc when a direction that corresponds to the track of the touch operation and is determined by the determining module is a first direction, where the first direction is a clockwise direction or an anti-clockwise direction, and a larger radian of the arc leads to a larger quantity of switched pages, or a page switching-down unit configured to switch a current page to a next page according to the radian of the arc when a direction that corresponds to the track of the touch operation and is determined by the determining module is a second direction, where the second direction is a direction other than a first direction in a clockwise direction or an anti-clockwise direction.

A third aspect of the embodiments of the present disclosure provides an operation track response apparatus, including a memory, an input/output device, a processor, and a bus system, where the memory is configured to store a program. The processor is configured to execute the program stored in the memory, and specific steps include controlling the input/output device to receive a touch operation triggered by a user on a current display interface, and output a current display interface obtained after the user triggers the touch operation, detecting the touch operation triggered by the user on the current display interface, determining a radian of the arc if it is detected that a track of the touch operation is an arc, and adjusting, according to the radian of the arc, content presented on the current display interface, where different radians correspond to adjustment of different degrees, and the bus system is configured to connect the memory, the input/output device, and the processor such that the memory, the input/output device, and the processor communicate.

With reference to the third aspect of the embodiments of the present disclosure, in a first possible implementation manner, when the content presented on the current display interface is a video or audio that is being played, the processor is further configured to perform the following step of adjusting a current playing progress of the video or audio according to the radian of the arc, where the playing progress includes fast-forward playing and rewind playing, and a larger radian leads to a larger degree of fast-forward or rewind.

With reference to the first possible implementation manner of the third aspect of the embodiments of the present disclosure, in a second possible implementation manner, a progress bar of the audio or video includes multiple preset playing points, in the progress bar, a playing point closer to a playing end position corresponds to a playing time with a longer distance from a playing start position, and the processor is further configured to perform the following steps of determining a target playing point according to the radian of the arc and a preset correspondence between a radian and a playing point, and starting to play the audio or video from the target playing point, where the target playing point is one of the multiple preset playing points, and in the progress bar, a playing point closer to the playing end position corresponds to a larger radian.

With reference to the third aspect of the embodiments of the present disclosure, in a third possible implementation manner, when the content presented on the current display interface is a single picture, the processor is further configured to perform the following step of zooming in on the single picture according to the radian of the arc when a direction corresponding to the track of the touch operation is a first direction, or zooming out on the single picture according to the radian of the arc when a direction corresponding to the track of the touch operation is a second direction, where the first direction is one of a clockwise direction or an anti-clockwise direction, and the second direction is the other of the clockwise direction or the anti-clockwise direction.

With reference to the third possible implementation manner of the third aspect of the embodiments of the present disclosure, in a fourth possible implementation manner, the single picture includes multiple preset zoom points, different zoom points correspond to different zoom percentages, and the processor is further configured to perform the following steps of determining a target zoom point according to the radian of the arc and a preset correspondence between a radian and a zoom point, and starting to zoom out on or zoom in on the corresponding zoom picture from the target zoom point, where the target zoom point is one of the multiple preset zoom points, and a larger radian of the arc corresponds to a larger zoom-out or zoom-in percentage of the picture.

With reference to the third aspect of the embodiments of the present disclosure, in a fifth possible implementation manner, when the content presented on the current display interface is one of multiple pictures, the processor is further configured to perform the following step of switching the current picture to a previous picture according to the radian of the arc when a direction corresponding to the track of the touch operation is a first direction, where the first direction is a clockwise direction or an anti-clockwise direction, or switching the current picture to a next picture according to the radian of the arc when a direction corresponding to the track of the touch operation is a second direction, where the second direction is a direction other than a first direction in a clockwise direction or an anti-clockwise direction.

With reference to the third aspect of the embodiments of the present disclosure, in a sixth possible implementation manner, when the content presented on the current display interface is one of multiple pictures, the processor is further configured to perform the following steps of determining, according to the radian of the arc and a preset correspondence between a radian and a quantity of switched pictures, a target display picture obtained by switching, and displaying the target display picture in the multiple pictures, where the target display picture is one of the multiple pictures, and a larger radian of the arc leads to a larger quantity of switched pictures.

With reference to the third aspect of the embodiments of the present disclosure, in a seventh possible implementation manner, when the content presented on the current display interface is multiple levels of folders, the processor is further configured to perform the following step of switching a current folder to a previous-level folder according to the radian of the arc when a direction corresponding to the track of the touch operation is a first direction, where the first direction is a clockwise direction or an anti-clockwise direction, and in the multiple folders, a folder closer to a root directory corresponds to a larger radian of the arc.

With reference to the third aspect of the embodiments of the present disclosure, in an eighth possible implementation manner, when the content presented on the current display interface is a single page, the processor is further configured to perform the following step of scrolling down the page according to the radian of the arc when a direction corresponding to the track of the touch operation is a first direction, where the first direction is a clockwise direction or an anti-clockwise direction, and in the page, a position closer to the bottom of the page corresponds to a larger radian of the arc, or scrolling up the page according to the radian of the arc when a direction corresponding to the track of the touch operation is a second direction, where the second direction is a direction other than a first direction in a clockwise direction or an anti-clockwise direction.

With reference to the third aspect of the embodiments of the present disclosure, in a ninth possible implementation manner, when the content presented on the current display interface is multiple pages, the processor is further configured to perform the following step of switching a current page to a previous page according to the radian of the arc when a direction corresponding to the track of the touch operation is a first direction, where the first direction is a clockwise direction or an anti-clockwise direction, and a larger radian of the arc leads to a larger quantity of switched pages, or switching a current page to a next page according to the radian of the arc when a direction corresponding to the track of the touch operation is a second direction, where the second direction is a direction other than a first direction in a clockwise direction or an anti-clockwise direction.

Optionally, with reference to the third aspect of the embodiments of the present disclosure, the processor is further configured to perform the following step in a date-time setting scenario, where adjusting the date-time forwards when the user slides clockwise on a touchscreen with an arc, or adjusting the date-time backwards when an arc is obtained by sliding in an anti-clockwise direction. It should be noted that operations corresponding to the clockwise sliding and the anti-clockwise sliding may also be adjusting the date-time backwards when the user slides clockwise on the touchscreen with an arc, or adjusting the date-time forwards when an arc is obtained by sliding in an anti-clockwise direction.

A quicker angular velocity of an arc corresponding to the operation track of the user leads to a quicker operation speed of forward adjustment or a quicker operation speed of backward adjustment. A slower angular velocity of an arc corresponding to the operation track of the user leads to a slower operation speed of forward adjustment or a slower operation speed of backward adjustment.

The processor is further configured to perform the following step of entering a fine adjustment mode when a finger of the user pauses in a setting process. Focuses are sequentially downgraded, that is, year, month, day, hour, minute, second are sequentially focused on, and a second-based adjustment mode is finally entered. When the finger departs, the fine adjustment mode is disabled.

The processor is further configured to perform the following steps in a volume adjustment scenario, where when sliding clockwise on the touchscreen, the user may turn up volume, and when sliding anti-clockwise on the touchscreen, may turn down the volume.

It can be seen from the foregoing technical solutions that the embodiments of the present disclosure have the following advantages.

In the embodiments of the present disclosure, an operation track response method is provided. An operation track response apparatus detects a touch operation triggered by a user on a current display interface, determines a radian of an arc if detecting that a track of the touch operation is the arc, and adjusts, according to the radian of the arc, content presented on the current display interface, where different radians correspond to adjustment of different degrees. The touch operation triggered by the user is responded to using the foregoing method, and media can still be controlled when an operating area is relatively small. This method is applicable to a touchscreen device with a small screen, has an extremely wide application scenario, and does not need assistance from a physical button, thereby improving practicability of the solutions.

BRIEF DESCRIPTION OF DRAWINGS

FIGS. 5A, 5B and 5C are schematic diagrams of a video or audio scenario applied to a smartwatch according to an embodiment of the present disclosure;

FIGS. 6A, 6B and 6C are schematic diagrams of a video or audio scenario applied to a smartwatch according to an embodiment of the present disclosure;

FIGS. 7A, 7B and 7C are schematic diagrams of a single-picture scenario applied to a smartwatch according to an embodiment of the present disclosure;

DESCRIPTION OF EMBODIMENTS

Figure 1:
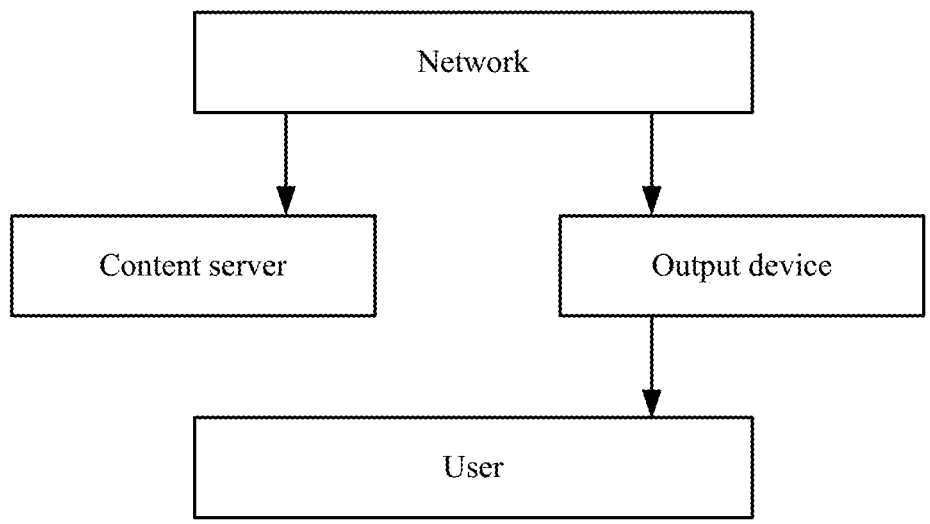
FIG. 1 is a diagram of a system architecture of an operation track response method according to an embodiment of the present disclosure.

The following clearly describes the technical solutions in the embodiments with reference to the accompanying drawings in the embodiments. The described embodiments are only some but not all of the embodiments of the present disclosure. All other embodiments obtained by persons skilled in the art based on the embodiments of the present disclosure without creative efforts shall fall within the protection scope of the present disclosure.

In the specification, claims, and accompanying drawings of the present disclosure, the terms "first," "second," "third," "fourth," and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in orders other than the order illustrated or described herein. Moreover, the terms "include," "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The embodiments of the present disclosure provide an operation track response method in order to perform an operation on a screen using an arc operation track. In this way, media can still be controlled when an operating area is relatively small. This method is applicable to a touchscreen device with a small screen, has an extremely wide application scenario, and does not need assistance from a physical button, thereby improving practicability of the solution.

It should be understood that a terminal device in the embodiments of the present disclosure may refer to a device providing a user with voice and/or data connectivity, a handheld device with a wireless connection function, or another processing device connected to a wireless modem.

A wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the RAN. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit (SU), a subscriber station (SS), a mobile station (MS), a remote station (RS), an access point (AP), a remote terminal (RT), an access terminal (AT), a user terminal (UT), a user agent (UA), a UD, or user equipment (UE).

It should be understood that the terminal device in the embodiments of the present disclosure may be applied to a Long Term Evolution (LTE) system. Although this solution may be applied to an LTE system for communication, persons skilled in the art should know that the present disclosure is applicable to both the LTE system and another wireless communications system, for example, a Global System for Mobile Communications (GSM), a Universal Mobile Telecommunications System (UMTS), a Code Division Multiple Access (CDMA) system, and a new network system. That the terminal device used in this solution performs communication in the foregoing scenario is also a feasible solution.

It should be noted that the operation track response method used in the embodiments may be applied to a smartwatch, smart glasses, or an interactive personality television (IPTV), or may be applied to another UD. This solution focuses on a case of applying the method to a smartwatch, but is not limited to applying a similar function only to a smartwatch.

A smartwatch is a wearable intelligent device, does not need to be handheld, is portable and convenient, and can implement motion sensing interaction. With development of mobile technologies, mobile functions are also added to many conventional electronic products. For example, a watch that can be used only for watching the time in the past can also be connected to the Internet using a smartphone or a home network now to display content such as incoming call information, social information and news, and weather information.

Such a new watch may be referred to as a smartwatch. Some smartwatches are sold on the market, and some smartwatches are still at a stage of sampling testing. This type of product is mainly designed for use when it is inconvenient for a user to use a smartphone, for example, when the consumer is riding on a bicycle or is carrying stuff filled in hands.

A smartwatch connects an embedded intelligent system of the watch and a system of a smartphone in order to connect to a network to implement multiple types of functions, and synchronize with functions of the phone, such as phone, short message service (SMS), mail, photo, music, and video. Currently, smartwatches on the market are roughly classified into two types. One type of smartwatch does not have a call function, and implements multiple functions by connecting to a smartphone, and functions of the mobile phone can be operated synchronously. The other type of smartwatch has a call function, and needs to support insertion of a subscriber identity module (SIM), and this type of watch is essentially a smartphone in a shape of a watch. Currently most smartwatches use an ANDROID system.

Smart glasses may be the same as a smartphone that has an independent operating system. A user installs programs that are provided by a program service provider in the smart glasses. Functions such as adding events to a calendar, map navigation, interaction with a buddy, taking a photo and shooting a video, having a video call with a friend may be controlled and completed using voice or actions, and a mobile communications network may be used to access to a wireless network.

An IPTV is a network television (TV) that is based on a broadband network and that accesses the broadband network using a set-top box to implement services such as a digital TV, a time-shifting TV, and an interactive TV. The IPTV has a basic TV live broadcast function, and can also implement functions such as live broadcast on random demands, time-shifting playing, and interactive entertainment. With development of technologies, the IPTV continuously develops, for example, supports functions such as playing an ultra-high-definition (UHD) program, a BLU-RAY high definition (HD) video, and a three-dimensional (3D) game.

All the foregoing three types of UDs may implement the operation track response method in the present disclosure, and have similar basic system architectures. Referring to FIG. 1, FIG. 1 is a diagram of a system architecture of an operation track response method according to an embodiment of the present disclosure. As shown in FIG. 1, the system architecture is a basic environment required for implementing the technical effects of the present disclosure, and modules are described in the following.

A network module is a virtualized platform for information transmission, reception, and sharing, and associates information about points, planes, and volumes using a network to share these resources. A network is a tool used by a user for information exchange, and brings experience for the user from all aspects using software tools used for text reading, picture viewing, video playing, download and transmission, games and chats, and the like.

A content server is a server that provides content required by a user, and the content server responds to a service request and performs processing. Generally, the content server should have a capability of carrying a service and ensuring the service. The content server may include a processor, a hard disk, a memory, a system bus, and the like, and is similar to a general-purpose computer architecture. In a network environment, the content server provides different types of services according to different content, for example, a file server, a database server, an application server, and a streaming server.

The content server transmits corresponding content to an output device using the Internet, and the output device finally presents the content to the user. The output device may include a personal computer (PC), a mobile phone, a tablet computer, a smartwatch, smart glasses, an IPTV, and the like. This is not limited herein.

Figure 2:
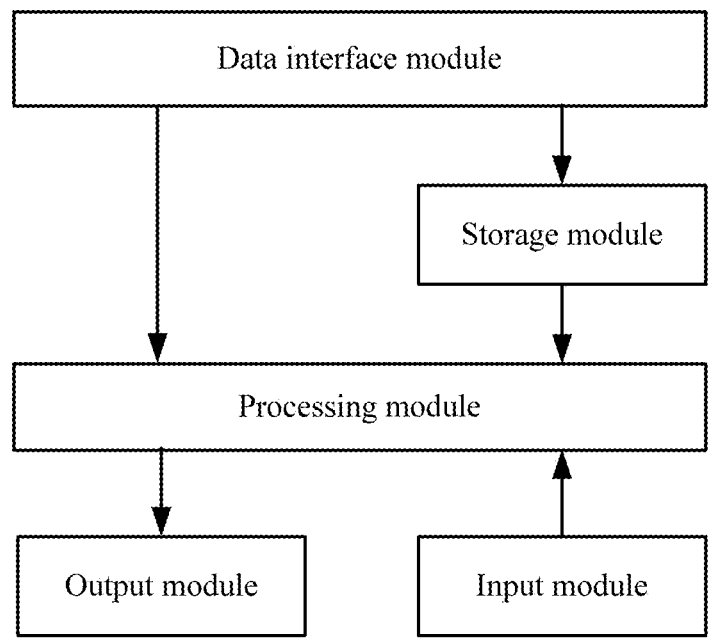
FIG. 2 is a schematic structural diagram of an operation track response apparatus according to an embodiment of the present disclosure.

In the embodiments, an operation track response apparatus is deployed in an output device, and the apparatus is configured to respond to an operation track initiated by a user, and present, to the user, operation content indicated by the corresponding operation track. Referring to FIG. 2, FIG. 2 is a schematic structural diagram of an operation track response apparatus according to an embodiment of the present disclosure. As shown in FIG. 2, the operation track response apparatus includes a data interface module, a storage module, a processing module, an input module, and an output module. The following describes functions of each module.

The data interface module is configured to obtain data from a network, and transmit the data to the storage module and the processing module. The data interface module is a connection circuit between an intelligent terminal system and the outside, has an addressing capability, and identifies a sent chip-select signal, determines, according to a read signal or a write signal, whether a currently performed operation is an input operation or an output operation, performs conversion between parallel data and serial data, identifies multiple types of signals, sends or receives an interruption request signal, receives a reset signal so that the data interface module and a connected peripheral are restarted, sets a related control signal using software. Some data interface modules may further set detection information according to a specific situation.

The storage module is configured to store a part of data transmitted by the data interface module, and this part of data is to-be-processed valid data. The stored data is then provided for the processing module for corresponding processing. Data storage in the storage module is a temporary file that is generated during data stream processing or information that needs to be searched for during data stream processing. Data is recorded in an internal or external storage medium of a computer in a specific format. Currently, there are three mainstreaming storage modes, and are respectively direct attached storage (DAS), network attached storage (NAS), and a storage area network (SAN). The storage manner of DAS is the same as a PC storage architecture, that is, an external storage device is directly mounted on an internal bus of a server, and a data storage device is a part of an entire server structure. The NAS uses a file server that is independent of a server and that is separately developed for network data storage to connect all storage devices and to form a network independently. In this way, the data storage is no longer attachment of a server, and exists in the network as an independent network point, and may be shared by all network users. The SAN is a connection manner that is based on a fiber medium and in which a server whose maximum transmission rate reaches 17 megabits per second (Mbps) accesses a memory.

The processing module is configured to process data from the data interface module, the storage module, and the input module, and transmit data to the output module. Main functions of the processing module include processing instructions, that is, controlling an execution sequence of the instructions in a program, executing an operation, that is, generating corresponding operation control signals according to functions of the instructions and sending the operation control signals to corresponding components in order to control these components to act according to a requirement of an instruction, controlling a time, that is, controlling to perform a specific operation in a specific time in a process of performing an instruction, processing data, which is mainly interpreting a computer instruction and processing data in computer software, and executing an instruction.

The input module is configured to receive data sent by an input device such as a remote control device or a touchscreen. The input module is a communication bridge between the operation track response apparatus and a user or another device. In practical application, an input device needs to have the input module, for example, a keyboard, a mouse, a camera, a scanner, a light pen, a handwriting tablet, a joystick, and a voice input apparatus. The input module may input, into the operation track response apparatus, original data and a program that processes the data, and the operation track response apparatus can receive various data that may be numeric data or may be various non-numeric data, such as a figure, a picture, and a sound.

The output module is configured to transmit data from the processing module to an output device. The output module may be a display of a smart TV, a tablet computer, a mobile phone, a smartwatch, or smart glasses. A specific presentation form in the display may be a number, a character, a picture, a sound, a video, or the like. It may be learned from this that the specific presentation form is not limited herein.

Figure 3:
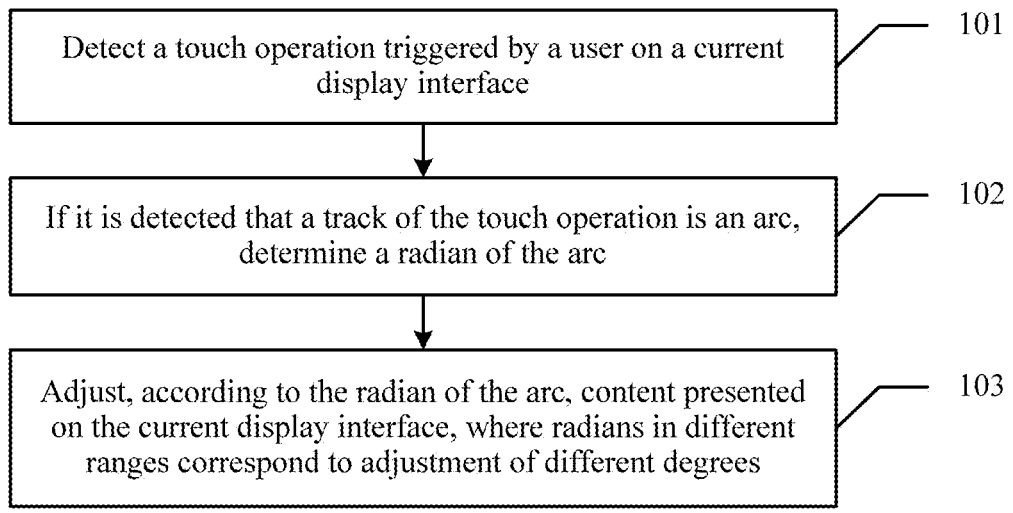
FIG. 3 is a flowchart diagram of an embodiment of an operation track response method according to an embodiment of the present disclosure.

The following describes an operation track response method of the present disclosure in detail. Referring to FIG. 3, an embodiment of an operation track response method provided in the embodiments of the present disclosure includes the following steps.

Step 101: Detect a touch operation triggered by a user on a current display interface.

In this embodiment, an operation track response apparatus may detect the touch operation triggered by the user on the current display interface. A series of control parameters are generated by the touch operation. The operation track response apparatus may determine, according to the control parameters, a specific operation type to which the operation currently triggered by the user belongs, or may determine a specific service that the operation triggered by the user is used to perform.

It may be understood that, in this embodiment, the touch operation triggered by the user on the current display interface is a curved track formed by consecutive displacement, including a circular track, a track of a shape (for example, of a triangle, a rectangular, or a square) that has a circumcircle, a multi-center enclosed shape (for example, an ellipse) track, and a multi-center unenclosed shape (for example, a spiral or a spring-shape line) track. In addition, some fixed operation gestures may be set, for example, a double tap operation gesture, a "V"-shape operation gesture, and an "S"-shape operation gesture. This is not limited herein.

If the present disclosure is applied to a smartwatch, the foregoing touch operation triggered by the user on the current display interface may be touching a touchscreen of the smartwatch using a finger in order to generate an electrical signal corresponding to the operation track, and then transfer the electrical signal to a processor for processing.

If the present disclosure is applied to smart glasses, the foregoing operation track may be rolling of eyeballs. An eyeball track catcher catches a corresponding eyeball rolling track. The caught eyeball rolling track is used as an operation track, a corresponding electrical signal is generated, and the electrical signal is then transferred to a processor for processing.

If the present disclosure is applied to an IPTV, the foregoing operation track may be a corresponding swaying track obtained by a sensor by controlling a remote control to sway. The swaying track is used as the operation track, a corresponding electrical signal is generated, and the electrical signal is then transferred to a processor for processing.

Step 102: If it is detected that a track of the touch operation is an arc, determine a radian of the arc.

In this embodiment, when the operation track response apparatus detects that the operation track of the touch operation is an arc, the radian of the arc is calculated using a path through which the track passes.

A radian of an arc is a measurement unit of an angle. The radian is a unit derived from the International System of Units, and an abbreviation of the unit is rad. A central angle subtended by an arc whose arc length is equal to a radius is 1 radian, that is, two rays coming out from a center to a circumference form an included angle and an arc directly subtending the included angle, and when a length of the arc is exactly equal to the radius of a circle, a radian of the included angle between the two rays is 1.

Step 103: Adjust, according to the radian of the arc, content presented on the current display interface, where different radians correspond to adjustment of different degrees.

In this embodiment, the operation track response apparatus adjusts, according to the obtained radian of the arc, the content presented on the current display interface. Different radians correspond to adjustment of different degrees, and there is a mapping relationship between a value of the radian and a degree of adjustment.

Figure 4:
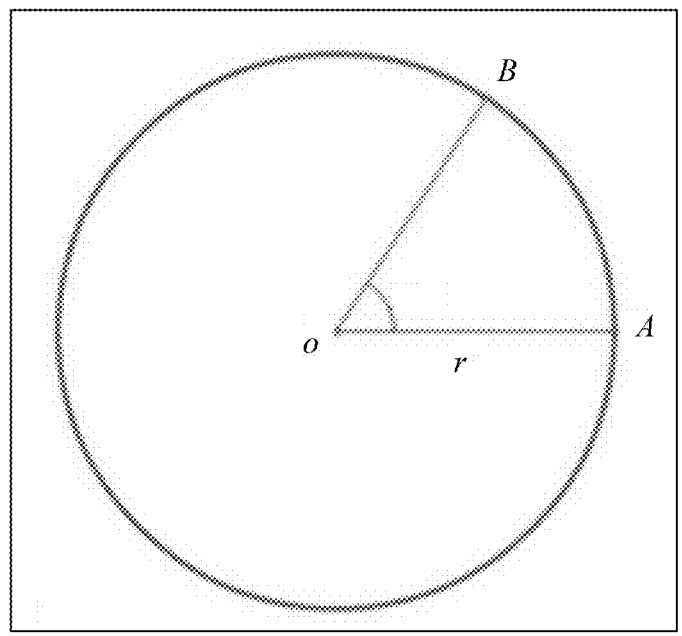
FIG. 4 is a schematic diagram of a radian of an arc according to an embodiment of the present disclosure.

Referring to FIG. 4, FIG. 4 is a schematic diagram of a radian of an arc according to an embodiment of the present disclosure. O is the center of the circle, and r is a radius. A circumference path starting from a point A along a circumference to a point B is an arc.

A calculation manner of an angular velocity in this embodiment is first obtaining, according to path information, a circle that uses a radian as a unit, where a circumference of the circle is $2\pi$ and corresponds to 360 degrees, and then calculating, according to time information, a value of a radian covered within a unit time, where the value is an angular velocity. A calculation formula of the angular velocity is as follows:

$$\omega = Ч/t,$$

where Ч is a radian covered by a path, t is a value of a time, and ω is an angular velocity whose unit is radian per second, and whose unit is "radian/second" (rad/s) in the International System of Units. 1 rad=360°/(2π)≈57°1745″

Alternatively, a unit of the angular velocity is rotation quantity/hour (for example, a rotation quantity per minute), that is, a value of a rotation speed is described using a rotational speed. A direction of the angular velocity is perpendicular to a plane of rotation, and may be determined according to a right-hand screw rule.

If a line is drawn from a point (O) to a mass point (P), a velocity vector of the mass point may be divided into a component along a radius (a radial component) and a component perpendicular to the radius (a tangential component). Because a radial motion of the mass point does not cause rotation relative to the origin (O), during calculation of the angular velocity of the mass point, a horizontal (or radial) component may be ignored. Therefore, rotation is completely caused by a motion in a tangential direction (as if the mass point does uniform circular motion around the origin), that is, an angular velocity is completely determined by a vertical (or tangential) component. A comparison expression between a change rate of an angular position of the mass point and a tangential velocity of the mass point is as follows:

$$\omega = d\varphi/dt.$$

$\varphi$ is an included angle between a vector r and v. It is derived that in a two-dimensional (2D) coordinate system, an angular velocity is a pseudoscalar that has only a value and has no direction, and is not a scalar. A difference between a scalar and a pseudoscalar lies in that when an axis and an axis' are inverted, sign symbols of the scalar do not change accordingly, but the pseudoscalar changes accordingly. An included angle and an angular velocity are pseudoscalars. By convention, a direction of rotation from an axis to another axis is a positive direction of rotation. If coordinate axes are inverted, and rotation of an object does not change, a sign symbol of an angle is changed, and a sign symbol of the angular velocity changes accordingly.

It should be noted that the foregoing operation track may be initiated by a finger on a touchscreen of a smartwatch, or may be initiated by rolling of eyeballs facing smart glasses, or may be initiated towards a sensor of an IPTV by a user with a remote control in hand, or the operation track may be input in another manner. This is not limited herein.

There is a correspondence between the angle described above and a playing speed. In addition, in some applications, an angular velocity may be defined as two or more than two playing speeds. For example, a standard playing speed is playing 24 frames per second, a playing speed corresponding to w1 is playing 3 frames per second, a playing speed corresponding to w2 is playing 6 frames per second, a playing speed corresponding to w3 is playing 12 frames per second, a playing speed corresponding to w4 is playing 48 frames per second, a playing speed corresponding to w5 is playing 96 frames per second. By analogy, a maximum quantity of frames that can be played per second is set. The solution is different from a case of fast-forward and rewind. This case is specific to consecutive playing, and is used to capture more detailed content, or ignore insignificant content, but playing in this case slows down or quickens.

It should be noted that, in practical application, for a threshold of determining whether the track of the touch operation triggered by the user is an arc, when the track of the touch operation is greater than or equal to the preset threshold, it is considered that the user slides with an arc on a screen, when the track of the touch operation is less than the preset threshold, it is considered that the user does not want to perform any operation, and the touch operation is only an inadvertent behavior. The preset threshold is not limited herein.

In this embodiment of the present disclosure, an operation track response method is provided. An operation track response apparatus detects a touch operation triggered by a user on a current display interface, if detecting that a track of the touch operation is an arc, determines a radian of the arc, and adjusts, according to the radian of the arc, content presented on the current display interface, where different radians correspond to adjustment of different degrees. The touch operation triggered by the user is responded to using the foregoing method, and media can still be controlled when an operating area is relatively small. This method is applicable to a touchscreen device with a small screen, has an extremely wide application scenario, and does not need assistance from a physical button, thereby improving practicability of the solution.

In the following, multiple application scenarios of responding to operation tracks on the basis of the embodiment corresponding to FIG. 3 are separately described. Optionally, on the basis of the foregoing embodiment corresponding to FIG. 3, in a first optional embodiment of the operation track response method provided in the embodiments of the present disclosure, when the content presented on the current display interface is a video or audio that is being played, adjusting, according to the radian of the arc, content presented on the current display interface may include adjusting a current playing progress of the video or audio according to the radian of the arc, where the playing progress includes fast-forward playing and rewind playing, and a larger radian leads to a larger degree of fast-forward or rewind.

This embodiment may be applied to a scenario in which the video or audio is being played. Referring to FIGS. 5A, 5B and 5C, FIGS. 5A, 5B and 5C are schematic diagrams of a video or audio scenario applied to a smartwatch according to an embodiment of the present disclosure. In the video or audio scenario, the operation track response apparatus adjusts the current playing progress of the video or audio according to the radian of the arc. The playing progress includes fast-forward playing and rewind playing, and a larger radian corresponding to the arc leads to a larger degree of fast-forward or rewind.

Further, there may be the following several cases. A memory in the operation track response apparatus prerecords a rule of sliding with an arc. If the touch operation triggered by the user on the current display interface is a clockwise arc, the video or audio is correspondingly fast-forwarded. It may be learned from a process from FIG. 5A to FIG. 5C an image is migrated with backward move on the progress bar. Conversely, if the touch operation triggered by the user on the current display interface is an anti-clockwise arc, the video or audio is correspondingly rewound, for example, from FIG. 5C to FIG. 5A.

Certainly, a clockwise arc touch operation track may be associated with rewind playing of the video or audio, and an anti-clockwise arc touch operation track may be associated with fast-forward playing of the video or audio.

The operation track response apparatus adjusts a degree of fast-forward playing or rewind playing according to a value of a radian of an arc. For example, 2 radians correspond to fast-forward of 10 seconds each time, and 3 radians correspond to fast-forward of 20 seconds each time. This is not limited herein.

In addition, in this embodiment of the present disclosure, for a video or audio scenario, an arc touch operation track is used to control a playing progress of a video or audio. This can help a user to perform an operation on a device with a small screen, and avoid inaccurate adjustment. In addition, a correspondence between a direction of the arc operation track and the video or audio may also be changed according to a user habit in order to improve user satisfaction and flexibility of the solution.

Optionally, on the basis of the foregoing first optional embodiment corresponding to FIG. 3, in a second optional embodiment of the operation track response method provided in the embodiments of the present disclosure, a progress bar of the audio or video includes multiple preset playing points, in the progress bar, a playing point closer to a playing end position corresponds to a playing time with a longer distance from a playing start position, and adjusting a current playing progress of the video or audio according to the radian of the arc may include determining a target playing point according to the radian of the arc and a preset correspondence between a radian and a playing point, and starting to play the audio or video from the target playing point, where the target playing point is one of the multiple preset playing points, and in the progress bar, a playing point closer to the playing end position corresponds to a larger radian.

In this embodiment, this solution is implemented still in the video or audio scenario. Multiple preset playing points may be set on the progress bar of the video or audio, and in the progress bar, a playing point closer to the end corresponds to a later playing time. Referring to FIGS. 6A, 6B and 6C, FIGS. 6A, 6B and 6C are schematic diagrams of a video or audio scenario applied to a smartwatch according to an embodiment of the present disclosure. In a video scenario with a progress bar, if there are several playing points on the progress bar, in a video screenshot corresponding to FIG. 6A, a first progress point displayed on the progress bar is a playing point of a current progress, and is denoted as a playing point 1, followed by a playing point 2, a playing point 3, and a playing point 4 sequentially. These playing points are marking points preset in a video segment. When the user performs an operation, a progress point is preferentially adsorbed to a proximate playing point. When the user slides clockwise or anti-clockwise on a touchscreen, a state shown in a video screenshot corresponding to FIG. 6B is displayed. When a progress point is adsorbed to the playing point 4 in a sliding process of the user, a state of a video screenshot corresponding to FIG. 6C is displayed. If sliding continues, an operation of fast-forward or rewind adjusting is continued until a progress point is adsorbed to another playing point. If there is no another playing point, uniform adjustment is performed.

The operation track response apparatus determines the target playing point according to the radian of the arc corresponding to the operation track triggered by the user and the preset correspondence between a radian and a playing point, and the target playing point indicates that the video or audio starts to be played from a position corresponding to this playing point, where the target playing point is one of the multiple preset playing points, and in the progress bar, a playing point closer to the playing end position corresponds to a larger radian.

Generally, a video or audio has a progress bar. When a task is processed, the progress bar shows, in a picture form in real time, a task processing speed, a completion rate, an unfinished task amount, and a possible required processing time, and is generally displayed in a rectangular bar.

In addition, in this embodiment of the present disclosure, there are playing points corresponding to an arc touch operation track, a target playing point is determined according to a radian of an arc and a preset correspondence between a radian and a playing point, and audio or a video starts to be played from the target playing point. Accordingly, this solution has a more user-friendly setting, helps a user to view content indicated by a marking point, improves user experience of the user, and improves feasibility of the solution. In addition, the user may set point information in the operation track. This action may be doing presetting during design of a software program, or may be accepting, after software is started, self-defined points set by the user. In this way, the user may not only set all points according to a preference of the user, but also add some functions of a specific point according to understandings of the user. Accordingly, flexibility of the solution is greatly improved, and user experience of the user is improved.

Optionally, on the basis of the foregoing embodiment corresponding to FIG. 3, in a third optional embodiment of the operation track response method provided in the embodiments of the present disclosure, when the content presented on the current display interface is a single picture, adjusting, according to the radian of the arc, content presented on the current display interface may include zooming in on the single picture according to the radian of the arc when a direction corresponding to the track of the touch operation is a first direction, or zooming out on the single picture according to the radian of the arc when a direction corresponding to the track of the touch operation is a second direction, where the first direction is one of a clockwise direction or an anti-clockwise direction, and the second direction is the other of the clockwise direction or the anti-clockwise direction.

In this embodiment, an example in which the method is applied to a single picture is described, and in practical application, the solution described in this embodiment may also be applied to a scenario such as a map. Referring to FIGS. 7A, 7B and 7C, FIGS. 7A, 7B and 7C are schematic diagrams of a single-picture scenario applied to a smartwatch according to an embodiment of the present disclosure. As shown in FIGS. 7A, 7B and 7C, when a user slides on a touchscreen in a clockwise direction, a zoom-out operation is performed on a picture. A screenshot corresponding to FIG. 7A is an original size of the picture. After the user slides on the touchscreen in a clockwise direction (shown in a screenshot corresponding to FIG. 7B), a zoom-out operation is performed on the single picture according to a radian of an arc, and a screenshot corresponding to FIG. 7C is finally displayed.

Figure 7D:
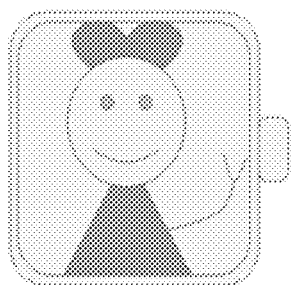
FIGS. 7D, 7E and 7F are schematic diagrams of a single-picture scenario applied to a smartwatch according to an embodiment of the present disclosure.
Figure 7E:
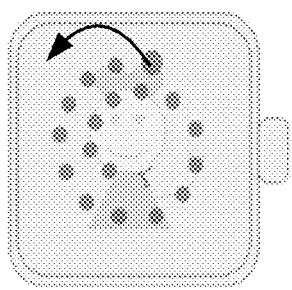
Figure 7F:
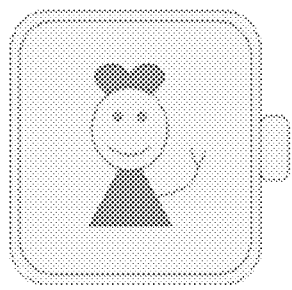

Referring to FIGS. 7D, 7E and 7F, FIGS. 7D, 7E and 7F are schematic diagrams of a single-picture scenario applied to a smartwatch according to an embodiment of the present disclosure. As shown in FIGS. 7D, 7E and 7F, when a user slides on a touchscreen in an anti-clockwise direction, a zoom-out operation is performed on a picture. A screenshot corresponding to FIG. 7D is an original size of the picture. After the user slides on the touchscreen in an anti-clockwise direction (shown in a screenshot corresponding to FIG. 7E), a zoom-out operation is performed on the single picture according to a radian of an arc, and a screenshot corresponding to FIG. 7F is finally displayed.

Figure 8A:
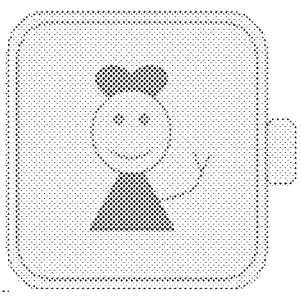
FIGS. 8A, 8B and 8C are schematic diagrams of a single-picture scenario applied to a smartwatch according to an embodiment of the present disclosure.
Figure 8B:
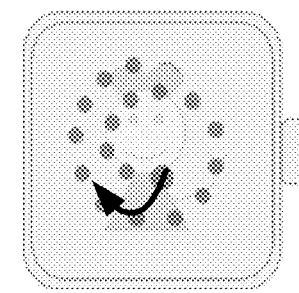
Figure 8C:
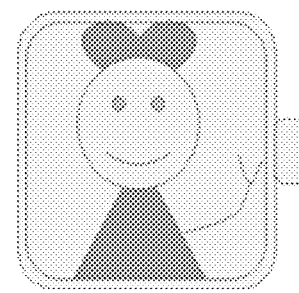

Referring to FIGS. 8A, 8B and 8C, FIGS. 8A, 8B and 8C are schematic diagrams of a single-picture scenario applied to a smartwatch according to an embodiment of the present disclosure. As shown in FIGS. 8A, 8B and 8C, when a user slides on a touchscreen in a clockwise direction, a zoom-in operation is performed on a picture. A screenshot corresponding to FIG. 8A is an original size of the picture. After the user slides on the touchscreen in a clockwise direction (shown in a screenshot corresponding to FIG. 8B), a zoom-in operation is performed on the single picture according to a radian of an arc, and a screenshot corresponding to FIG. 8C is finally displayed.

Figure 8D:
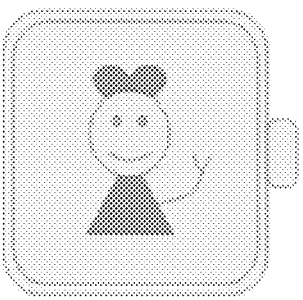
FIGS. 8D, 8E and 8F are schematic diagrams of a single-picture scenario applied to a smartwatch according to an embodiment of the present disclosure.
Figure 8E:
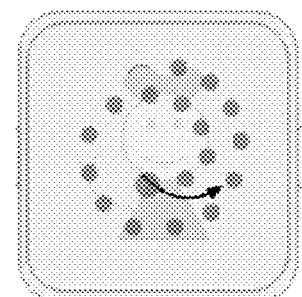
Figure 8F:
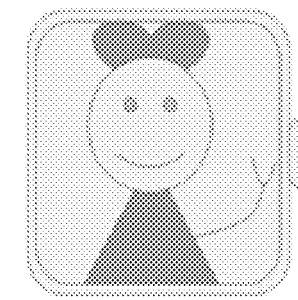

Referring to FIGS. 8D, 8E and 8F, FIGS. 8D, 8E and 8F are schematic diagrams of a single-picture scenario applied to a smartwatch according to an embodiment of the present disclosure. As shown in FIGS. 8D, 8E and 8F, when a user slides on a touchscreen in an anti-clockwise direction, a zoom-in operation is performed on a picture. A screenshot corresponding to FIG. 8D is an original size of the picture. After the user slides on the touchscreen in an anti-clockwise direction (shown in a screenshot corresponding to FIG. 8E), a zoom-in operation is performed on the single picture according to a radian of an arc, and a screenshot corresponding to FIG. 8F is finally displayed. However, it may be set, according to a user habit, that when the user slides in an anti-clockwise direction on the touchscreen, a zoom-out operation is accordingly performed on the single picture.

It should be noted that a spiral touch operation track in FIG. 7A to FIG. 8F is only an example. However, practical application is not limited to the spiral touch operation track, and may be a circular touch operation track or an arc touch operation track, or may be a touch operation track that is similar to a circle. A similarity is greater than or equal to a preset similarity. Therefore, a specific shape of a touch operation track is not limited herein.

In addition, in this embodiment of the present disclosure, an operation of controlling a picture size that is applied to a single-picture scenario is provided. When a direction corresponding to a track of a touch operation is a first direction, a zoom-in operation is performed on a single picture according to a radian of an arc, or when a direction corresponding to a track of a touch operation is a second direction, a zoom-out operation is performed on the single picture according to a radian of an arc, where the first direction is one of a clockwise direction or an anti-clockwise direction, and the second direction is the other of the clockwise direction or the anti-clockwise direction. In this way, a user can adjust a display size of the picture simply in a manner of sliding with an arc on a relatively small screen. This does not cause an inaccurate operation because of an extremely small screen such that user experience is better.

Optionally, on the basis of the foregoing third optional embodiment corresponding to FIG. 3, in a fourth optional embodiment of the operation track response method provided in the embodiments of the present disclosure, the single picture includes multiple preset zoom points, different zoom points correspond to different zoom percentages, and adjusting, according to the radian of the arc, content presented on the current display interface may include determining a target zoom point according to the radian of the arc and a preset correspondence between a radian and a zoom point, and starting to zoom out on or zoom in on the corresponding zoom picture from the target zoom point, where the target zoom point is one of the multiple preset zoom points, and a larger radian of the arc corresponds to a larger zoom-out or zoom-in percentage of the picture.

In this embodiment, the operation track response method in the solutions of the present disclosure may also be used in the single-picture scenario. Zoom points are preset in a picture, and each zoom point also corresponds to a different zoom percentage. The target zoom point is determined according to the radian of the arc and the preset correspondence between a radian and a zoom point, and a zoom-out operation or a zoom-in operation starts to be performed on the corresponding zoom picture from the target zoom point.

For example, five zoom points are set in a single picture. A zoom point A indicates zooming out on the picture to a quarter of the original picture, a zoom point B indicates zooming out on the picture to a half of the original picture, a zoom point C indicates zooming in on the picture to twice as large as the original picture, a zoom point D indicates zooming in on the picture to four times as large as the original picture, and a zoom point E indicates zooming in on the picture to eight times as large as the original picture. The user slides on a touchscreen with an arc. If a target zoom point that is passed through by the arc is the zoom point C, a zoom-in operation is performed on the picture to twice as large as the original picture. A larger radian of the arc obtained by sliding leads to a larger zoom-in or zoom-out percentage of the picture. The target zoom point is one of the multiple preset zoom points.

In this embodiment of the present disclosure, a zoom operation may be performed on a single picture. This can help a user to perform a zoom-in or zoom-out operation on the picture on a small screen. In addition, the operation track response apparatus can directly zoom in on or zoom out on the picture to ideal times according to a user requirement, instead of gradually adjusting a display size of the picture, which is more practicable.

Optionally, on the basis of the foregoing embodiment corresponding to FIG. 3, in a fifth optional embodiment of the operation track response method provided in the embodiments of the present disclosure, when the content presented on the current display interface is one of multiple pictures, adjusting, according to the radian of the arc, content presented on the current display interface may include switching the current picture to a previous picture according to the radian of the arc when a direction corresponding to the track of the touch operation is a first direction, where the first direction is a clockwise direction or an anti-clockwise direction, or switching the current picture to a next picture according to the radian of the arc when a direction corresponding to the track of the touch operation is a second direction, where the second direction is a direction other than the first direction in a clockwise direction or an anti-clockwise direction.

In this embodiment, when one of the multiple pictures is presented on the current display interface, the current picture in the multiple pictures is switched to the previous picture or the next picture according to the touch operation track of the user.

The direction corresponding to the operation track further refers to a direction from a start position at which the user starts to slide on the touchscreen with an arc to an end position at which sliding with the arc is completed. The arc from the start position to the end position has a direction, that is, the direction corresponding to the operation track.

For example, when the user slides on the touchscreen with a clockwise touch operation track, the current picture is switched to the next picture according to the radian of the arc. Certainly, an operation of switching to the next picture may be associated with an anti-clockwise touch operation track according to a user habit. This is not limited herein.

When the user slides on the touchscreen with a clockwise touch operation track, the current picture is correspondingly switched to the next picture, and in this case, when the user slides on the touchscreen with an anti-clockwise touch operation track, the current picture is correspondingly switched to the previous picture. When the user slides on the touchscreen with an anti-clockwise touch operation track, the current picture is correspondingly switched to the next picture, and in this case, when the user slides on the touchscreen with a clockwise touch operation track, the current picture is correspondingly switched to the previous picture.

In addition, in this embodiment of the present disclosure, an operation of controlling picture switching that is applied to a multiple-picture scenario is provided. When a direction corresponding to a track of a touch operation is a first direction, a current picture is switched to a previous picture according to a radian of an arc, where the first direction is a clockwise direction or an anti-clockwise direction, or when a direction corresponding to a track of a touch operation is a second direction, a current picture is switched to a next picture according to a radian of an arc, where the second direction is a direction other than the first direction in a clockwise direction or an anti-clockwise direction. In this way, a defect of inconvenience of switching pictures on a small screen is fixed, and flexibility and practicability of the solution are improved.

Optionally, on the basis of the foregoing embodiment corresponding to FIG. 3, in a sixth optional embodiment of the operation track response method provided in the embodiments of the present disclosure, when the content presented on the current display interface is one of multiple pictures, adjusting, according to the radian of the arc, content presented on the current display interface may include determining, according to the radian of the arc and a preset correspondence between a radian and a quantity of switched pictures, a target display picture obtained by switching, and displaying the target display picture in the multiple pictures, where the target display picture is one of the multiple pictures, and a larger radian of the arc leads to a larger quantity of switched pictures.

In this embodiment, when one of the multiple pictures is presented on the current display interface, if multiple pictures need to be switched once to find a picture required by the user, a quantity of pictures switched in this time is determined according to the radian of the arc corresponding to the track obtained by sliding by the user on the touchscreen. After touch operations of the user are performed on current pictures, if five pictures are switched, a sixth picture in the current pictures is the target display picture. The target display picture is one of the multiple pictures, and a larger radian of the arc leads to a larger quantity of switched pictures.

In addition, in this embodiment of the present disclosure, when there are a relatively large quantity of pictures, and a penultimate picture in all pictures needs to be found, more pictures may be rapidly switched if a radian of an arc corresponding to a track of a touch operation is simply enlarged. In one aspect, a time of selecting a required picture from multiple pictures by a user can be reduced, and application efficiency of the solution can be improved. In another aspect, flexibility of the solution can be improved.

Optionally, on the basis of the foregoing embodiment corresponding to FIG. 3, in a seventh optional embodiment of the operation track response method provided in the embodiments of the present disclosure, when the content presented on the current display interface is multiple levels of folders, adjusting, according to the radian of the arc, content presented on the current display interface may include switching a current folder to a previous-level folder according to the radian of the arc when a direction corresponding to the track of the touch operation is a first direction, where the first direction is a clockwise direction or an anti-clockwise direction, and in the multiple folders, a folder closer to a root directory corresponds to a larger radian of the arc.

In this embodiment, the direction corresponding to the operation track further refers to a direction from a start position at which the user starts to slide on the touchscreen with an arc to an end position at which sliding with the arc is completed. The arc from the start position to the end position has a direction, that is, the direction corresponding to the operation track.

If the presented content is the multiple levels of folders, when the direction corresponding to the track of the touch operation is the first direction, the current folder may be switched to the previous-level folder according to the radian of the arc. For example, a folder A includes a sub-folder $A_1$, a sub-folder $A_2$, and a sub-folder $A_3$. When the touch operation track of the user is clockwise, the current folder, the sub-folder $A_2$, may be switched to the folder A according to the radian of the arc. The first direction may be a clockwise direction or may be an anti-clockwise direction, and in the multiple folders, a folder closer to a root directory corresponds to a larger radian of the arc.

In addition, in this embodiment of the present disclosure, in a scenario of multiple levels of folders, the used operation track response method is as follows. When a direction corresponding to a track of a touch operation is a first direction, a current folder is switched to a previous-level folder according to a radian of an arc, where the first direction is a clockwise direction or an anti-clockwise direction, and in the multiple folders, a folder closer to a root directory corresponds to a larger radian of the arc. Accordingly, a folder required by a user is flexibly switched to in the scenario of multiple levels of folders, and practicability and flexibility of the solution are greatly improved.

Optionally, on the basis of the foregoing embodiment corresponding to FIG. 3, in an eighth optional embodiment of the operation track response method provided in the embodiments of the present disclosure, when the content presented on the current display interface is a single page, adjusting, according to the radian of the arc, content presented on the current display interface may include scrolling down the page according to the radian of the arc when a direction corresponding to the track of the touch operation is a first direction, where the first direction is a clockwise direction or an anti-clockwise direction, and in the page, a position closer to the bottom of the page corresponds to a larger radian of the arc, or scrolling up the page according to the radian of the arc when a direction corresponding to the track of the touch operation is a second direction, where the second direction is a direction other than the first direction in a clockwise direction or an anti-clockwise direction.

In this embodiment, the direction corresponding to the operation track further refers to a direction from a start position at which the user starts to slide on the touchscreen with an arc to an end position at which sliding with the arc is completed. The arc from the start position to the end position has a direction, that is, the direction corresponding to the operation track.

In a single-page scenario, for example, a scenario of an e-book or a web page, when the direction corresponding to the track of the touch operation is a clockwise direction, the page is scrolled down according to the radian of the arc, and a larger radian of the arc indicates scrolling down the page to a position closer to the bottom of the page. Conversely, when the direction corresponding to the track of the touch operation is an anti-clockwise direction, the page is scrolled up according to the radian of the arc. In addition, according to an operation habit of the user, it may be set that, when the direction corresponding to the track of the touch operation is an anti-clockwise direction, the page is scrolled down according to the radian of the arc, and a larger radian of the arc indicates scrolling down the page to a position closer to the bottom of the page, and when the direction corresponding to the track of the touch operation is a clockwise direction, the page is scrolled up according to the radian of the arc.

In addition, in this embodiment of the present disclosure, for a single-page scenario, a page may be scrolled using a track of a touch operation. The page may be easily scrolled on a small screen. In addition, it helps the user to view content desired by the user. This may be implemented using a simple clockwise or anti-clockwise touch track in order to improve feasibility of the solution.

Optionally, on the basis of the foregoing embodiment corresponding to FIG. 3, in a ninth optional embodiment of the operation track response method provided in the embodiments of the present disclosure, when the content presented on the current display interface is multiple pages, adjusting, according to the radian of the arc, content presented on the current display interface may include switching a current page to a previous page according to the radian of the arc when a direction corresponding to the track of the touch operation is a first direction, where the first direction is a clockwise direction or an anti-clockwise direction, and a larger radian of the arc leads to a larger quantity of switched pages, or switching a current page to a next page according to the radian of the arc when a direction corresponding to the track of the touch operation is a second direction, where the second direction is a direction other than the first direction in a clockwise direction or an anti-clockwise direction.

In this embodiment, the direction corresponding to the operation track further refers to a direction from a start position at which the user starts to slide on the touchscreen with an arc to an end position at which sliding with the arc is completed. The arc from the start position to the end position has a direction, that is, the direction corresponding to the operation track.

When the current display interface is one of the multiple pages, pages may be switched in a multiple-page scenario. When the direction corresponding to the track of the touch operation is clockwise, the current page is switched to the previous page according to the radian of the arc, and a larger radian of the arc leads to a larger quantity of switched pages. Conversely, when the direction corresponding to the track of the touch operation is anti-clockwise, the current page is switched to the next page according to the radian of the arc, and a larger radian of the arc leads to a larger quantity of switched pages. In addition, according to an operation habit of the user, it may be set that, when the direction corresponding to the track of the touch operation is anti-clockwise, the current page is switched to the previous page according to the radian of the arc, and a larger radian of the arc leads to a larger quantity of switched pages. Conversely, when the direction corresponding to the track of the touch operation is clockwise, the current page is switched to the next page according to the radian of the arc, and a larger radian of the arc leads to a larger quantity of switched pages.

In addition, in this embodiment of the present disclosure, in a case of multiple pages, for example, for an e-book, internal content may be viewed in a page turning manner. Page switching is particularly commonly used in a scenario of a relatively large quantity of pages, and for a single page, page scrolling is performed. Therefore, in this embodiment, practicability and operability of the solution are improved.

Figure 9:
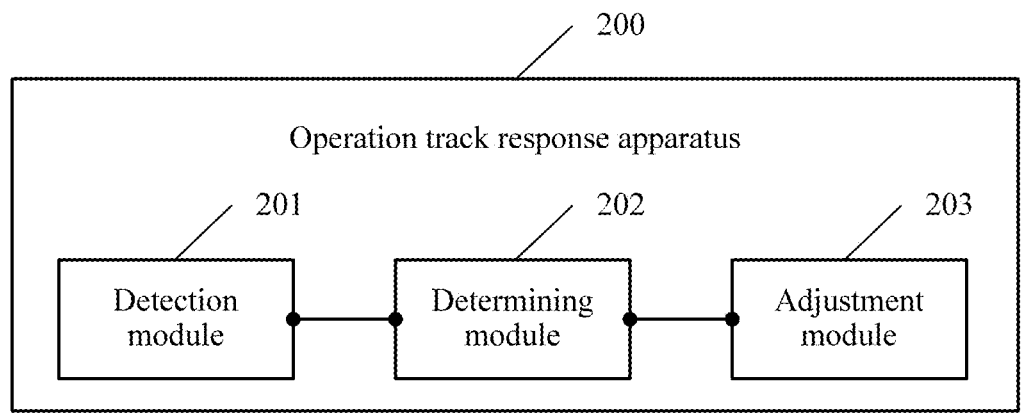
FIG. 9 is a schematic diagram of an embodiment of an operation track response apparatus according to an embodiment of the present disclosure.

The following describes an operation track response apparatus of the present disclosure in detail. Referring to FIG. 9, an operation track response apparatus 200 in an embodiment of the present disclosure includes a detection module 201 configured to detect a touch operation triggered by a user on a current display interface, a determining module 202 configured to determine a radian of an arc if the detection module 201 detects that a track of the touch operation is the arc, and an adjustment module 203 configured to adjust, according to the radian that is of the arc and is determined by the determining module 202, content presented on the current display interface, where different radians correspond to adjustment of different degrees.

In this embodiment, the detection module 201 detects the touch operation triggered by the user on the current display interface, and if the detection module 201 detects that the track of the touch operation is the arc, the determining module 202 determines the radian of the arc. The adjustment module 203 adjusts, according to the radian that is of the arc and is determined by the determining module, the content presented on the current display interface, where different radians correspond to adjustment of different degrees.

In this embodiment of the present disclosure, an operation track response method is provided. the operation track response apparatus 200 detects a touch operation triggered by a user on a current display interface, if the touch operation is an arc, determines a radian of the arc, and adjusts, according to the radian of the arc, content presented on the current display interface, where different radians correspond to adjustment of different degrees. The touch operation triggered by the user is responded to using the foregoing method, and media can still be controlled when an operating area is relatively small. This method is applicable to a touchscreen device with a small screen, has an extremely wide application scenario, and does not need assistance from a physical button, thereby improving practicability of the solution.

Optionally, on the basis of the foregoing optional embodiment corresponding to FIG. 9, another embodiment of the operation track response apparatus 200 provided in the embodiments of the present disclosure includes the detection module 201 is configured to detect a touch operation triggered by a user on a current display interface, the determining module 202 is configured to determine a radian of an arc if a track of the touch operation is the arc and the adjustment module 203 is configured to adjust, according to the radian that is of the arc and is determined by the determining module 202, content presented on the current display interface, where different radians correspond to adjustment of different degrees.

When the content presented on the current display interface is a video or audio that is being played, the adjustment module 203 is further configured to adjust a current playing progress of the video or audio according to the radian that is of the arc and is determined by the determining module 202, where the playing progress includes fast-forward playing and rewind playing, and a larger radian leads to a larger degree of fast-forward or rewind.

In addition, in this embodiment of the present disclosure, for a video or audio scenario, an arc touch operation track is used to control a playing progress of a video or audio. This can help a user to perform an operation on a device with a small screen, and avoid inaccurate adjustment. In addition, a correspondence between a direction of the arc operation track and the video or audio may also be changed according to a user habit in order to improve user satisfaction and flexibility of the solution.

Optionally, on the basis of the foregoing optional embodiment corresponding to FIG. 9, another embodiment of the operation track response apparatus 200 provided in the embodiments of the present disclosure includes the detection module 201 configured to detect a touch operation triggered by a user on a current display interface, the determining module 202 configured to determine a radian of an arc if the detection module 201 detects that a track of the touch operation is the arc, and the adjustment module 203 configured to adjust, according to the radian that is of the arc and is determined by the determining module 202, content presented on the current display interface, where different radians correspond to adjustment of different degrees.

When the content presented on the current display interface is a video or audio that is being played, the adjustment module 203 is further configured to adjust a current playing progress of the video or audio according to the radian that is of the arc and is determined by the determining module 202, where the playing progress includes fast-forward playing and rewind playing, and a larger radian leads to a larger degree of fast-forward or rewind.

A progress bar of the audio or video includes multiple preset playing points, in the progress bar, a playing point closer to a playing end position corresponds to a playing time with a longer distance from a playing start position, and the adjustment module 203 is further configured to determine a target playing point according to the radian that is of the arc and is determined by the determining module 202 and a preset correspondence between a radian and a playing point, and start to play the audio or video from the target playing point, where the target playing point is one of the multiple preset playing points, and in the progress bar, a playing point closer to the playing end position corresponds to a larger radian.

In addition, in this embodiment of the present disclosure, there are playing points corresponding to an arc touch operation track, a target playing point is determined according to a radian of an arc and a preset correspondence between a radian and a playing point, and audio or a video starts to be played from the target playing point. Accordingly, this solution has a more user-friendly setting, helps a user to view content indicated by a marking point, improves user experience of the user, and improves feasibility of the solution. In addition, the user may set point information in the operation track. This action may be doing presetting during design of a software program, or may be accepting, after software is started, self-defined points set by the user. In this way, the user may not only set all points according to a preference of the user, but also add some functions of a specific point according to understandings of the user. Accordingly, flexibility of the solution is greatly improved, and user experience of the user is improved.

Optionally, on the basis of the foregoing optional embodiment corresponding to FIG. 9, another embodiment of the operation track response apparatus 200 provided in the embodiments of the present disclosure includes the detection module 201 configured to detect a touch operation triggered by a user on a current display interface, the determining module 202 configured to determine a radian of an arc if the detection module 201 detects that a track of the touch operation is the arc, and an adjustment module 203 configured to adjust, according to the radian that is of the arc and is determined by the determining module 202, content presented on the current display interface, where different radians correspond to adjustment of different degrees.

When the content presented on the current display interface is a single picture, the adjustment module 203 is further configured to zoom in on the single picture according to the radian of the arc when a direction that corresponds to the track of the touch operation and is determined by the determining module 202 is a first direction, and zoom out on the single picture according to the radian of the arc when a direction that corresponds to the track of the touch operation and is determined by the determining module 202 is a second direction, where the first direction is one of a clockwise direction or an anti-clockwise direction, and the second direction is the other of the clockwise direction or the anti-clockwise direction.

In addition, in this embodiment of the present disclosure, an operation of controlling a picture size that is applied to a single-picture scenario is provided. When a direction corresponding to a track of a touch operation is a first direction, a zoom-in operation is performed on a single picture according to a radian of an arc, or when a direction corresponding to a track of a touch operation is a second direction, a zoom-out operation is performed on the single picture according to a radian of an arc, where the first direction is one of a clockwise direction or an anti-clockwise direction, and the second direction is the other of the clockwise direction or the anti-clockwise direction. In this way, a user can adjust a display size of the picture simply in a manner of sliding with an arc on a relatively small screen. This does not cause an inaccurate operation because of an extremely small screen such that user experience is better.

Optionally, on the basis of the foregoing optional embodiment corresponding to FIG. 9, another embodiment of an operation track response apparatus 200 provided in the embodiments of the present disclosure includes the detection module 201 configured to detect a touch operation triggered by a user on a current display interface, the determining module 202 configured to determine a radian of an arc if the detection module 201 detects that a track of the touch operation is the arc, and the adjustment module 203 configured to adjust, according to the radian that is of the arc and is determined by the determining module 202, content presented on the current display interface, where different radians correspond to adjustment of different degrees.

When the content presented on the current display interface is a single picture, the adjustment module 203 is further configured to zoom in on the single picture according to the radian of the arc when a direction that corresponds to the track of the touch operation and is determined by the determining module 202 is a first direction, and zoom out on the single picture according to the radian of the arc when a direction that corresponds to the track of the touch operation and is determined by the determining module 202 is a second direction, where the first direction is one of a clockwise direction or an anti-clockwise direction, and the second direction is the other of the clockwise direction or the anti-clockwise direction.

The single picture includes multiple preset zoom points, different zoom points correspond to different zoom percentages, and the adjustment module 203 is further configured to determine a target zoom point according to the radian of the arc and a preset correspondence between a radian and a zoom point, and start to zoom out on or zoom in on the corresponding zoom picture from the target zoom point, where the target zoom point is one of the multiple preset zoom points, and a larger radian of the arc corresponds to a larger zoom-out or zoom-in percentage of the picture.

In this embodiment of the present disclosure, a zoom operation may be performed on a single picture. This can help a user to perform a zoom-in or zoom-out operation on the picture on a small screen. In addition, the operation track response apparatus can directly zoom in on or zoom out on the picture to ideal times according to a user requirement, instead of gradually adjusting a display size of the picture, which is more practicable.

Optionally, on the basis of the foregoing optional embodiment corresponding to FIG. 9, another embodiment of the operation track response apparatus 200 provided in the embodiments of the present disclosure includes the detection module 201 configured to detect a touch operation triggered by a user on a current display interface, the determining module 202 configured to determine a radian of an arc if the detection module 201 detects that a track of the touch operation is the arc, and the adjustment module 203 configured to adjust, according to the radian that is of the arc and is determined by the determining module 202, content presented on the current display interface, where different radians correspond to adjustment of different degrees.

When the content presented on the current display interface is one of multiple pictures, the adjustment module 203 is further configured to switch the current picture to a previous picture according to the radian of the arc when a direction that corresponds to the track of the touch operation and is determined by the determining module 202 is a first direction, where the first direction is a clockwise direction or an anti-clockwise direction, or switch the current picture to a next picture according to the radian of the arc when a direction that corresponds to the track of the touch operation and is determined by the determining module 202 is a second direction, where the second direction is a direction other than a first direction in a clockwise direction or an anti-clockwise direction.

In addition, in this embodiment of the present disclosure, an operation of controlling picture switching that is applied to a multiple-picture scenario is provided. When a direction corresponding to a track of a touch operation is a first direction, a current picture is switched to a previous picture according to a radian of an arc, where the first direction is a clockwise direction or an anti-clockwise direction, or when a direction corresponding to a track of a touch operation is a second direction, a current picture is switched to a next picture according to a radian of an arc, where the second direction is a direction other than the first direction in a clockwise direction or an anti-clockwise direction. In this way, a defect of inconvenience of switching pictures on a small screen is fixed, and flexibility and practicability of the solution are improved.

Optionally, on the basis of the foregoing optional embodiment corresponding to FIG. 9, another embodiment of the operation track response apparatus 200 provided in the embodiments of the present disclosure includes the detection module 201 configured to detect a touch operation triggered by a user on a current display interface, the determining module 202 configured to determine a radian of an arc if the detection module 201 detects that a track of the touch operation is the arc, and the adjustment module 203 configured to adjust, according to the radian that is of the arc and is determined by the determining module 202, content presented on the current display interface, where different radians correspond to adjustment of different degrees.

When the content presented on the current display interface is one of multiple pictures, the adjustment module 203 is configured to determine, according to the radian that is of the arc and is determined by the determining module 202 and a preset correspondence between a radian and a quantity of switched pictures, a target display picture obtained by switching, and display the target display picture in the multiple pictures, where the target display picture is one of the multiple pictures, and a larger radian of the arc leads to a larger quantity of switched pictures.

In addition, in this embodiment of the present disclosure, when there are a relatively large quantity of pictures, and a penultimate picture in all pictures needs to be found, more pictures may be rapidly switched if a radian of an arc corresponding to a track of a touch operation is simply enlarged. In one aspect, a time of selecting a required picture from multiple pictures by a user can be reduced, and application efficiency of the solution can be improved. In another aspect, flexibility of the solution can be improved.

Optionally, on the basis of the foregoing optional embodiment corresponding to FIG. 9, another embodiment of the operation track response apparatus 200 provided in the embodiments of the present disclosure includes a detection module 201 configured to detect a touch operation triggered by a user on a current display interface, a determining module 202 configured to determine a radian of an arc if the detection module 201 detects that a track of the touch operation is the arc, and the adjustment module 203 configured to adjust, according to the radian that is of the arc and is determined by the determining module 202, content presented on the current display interface, where different radians correspond to adjustment of different degrees.

When the content presented on the current display interface is multiple levels of folders, the adjustment module 203 is further configured to switch a current folder to a previous-level folder according to the radian of the arc when a direction that corresponds to the track of the touch operation and is determined by the determining module 202 is a first direction, where the first direction is a clockwise direction or an anti-clockwise direction, and in the multiple folders, a folder closer to a root directory corresponds to a larger radian of the arc.

In addition, in this embodiment of the present disclosure, in a scenario of multiple levels of folders, the used operation track response method is as follows. When a direction corresponding to a track of a touch operation is a first direction, a current folder is switched to a previous-level folder according to a radian of an arc, where the first direction is a clockwise direction or an anti-clockwise direction, and in the multiple folders, a folder closer to a root directory corresponds to a larger radian of the arc. Accordingly, a folder required by a user is flexibly switched to in the scenario of multiple levels of folders, and practicability and flexibility of the solution are greatly improved.

Optionally, on the basis of the foregoing optional embodiment corresponding to FIG. 9, another embodiment of the operation track response apparatus 200 provided in the embodiments of the present disclosure includes the detection module 201 configured to detect a touch operation triggered by a user on a current display interface, the determining module 202 configured to determine a radian of an arc if the detection module 201 detects that a track of the touch operation is the arc, and an adjustment module 203 configured to adjust, according to the radian that is of the arc and is determined by the determining module 202, content presented on the current display interface, where different radians correspond to adjustment of different degrees.

When the content presented on the current display interface is a single page, the adjustment module 203 is further configured to scroll down the page according to the radian of the arc when a direction that corresponds to the track of the touch operation and is determined by the determining module 202 is a first direction, where the first direction is a clockwise direction or an anti-clockwise direction, and in the page, a position closer to the bottom of the page corresponds to a larger radian of the arc, or scroll up the page according to the radian of the arc when a direction that corresponds to the track of the touch operation and is determined by the determining module 202 is a second direction, where the second direction is a direction other than a first direction in a clockwise direction or an anti-clockwise direction.

In addition, in this embodiment of the present disclosure, for a single-page scenario, a page may be scrolled using a track of a touch operation. The page may be easily scrolled on a small screen. In addition, it helps the user to view content desired by the user. This may be implemented using a simple clockwise or anti-clockwise touch track in order to improve feasibility of the solution.

Optionally, on the basis of the foregoing optional embodiment corresponding to FIG. 9, another embodiment of the operation track response apparatus 200 provided in the embodiments of the present disclosure includes the detection module 201 configured to detect a touch operation triggered by a user on a current display interface, the determining module 202 configured to determine a radian of an arc if the detection module 201 detects that a track of the touch operation is the arc, and an adjustment module 203 configured to adjust, according to the radian that is of the arc and is determined by the determining module 202, content presented on the current display interface, where different radians correspond to adjustment of different degrees.

When the content presented on the current display interface is multiple pages, the adjustment module 203 is configured to switch a current page to a previous page according to the radian of the arc when a direction that corresponds to the track of the touch operation and is determined by the determining module 202 is a first direction, where the first direction is a clockwise direction or an anti-clockwise direction, and a larger radian of the arc leads to a larger quantity of switched pages, or switch a current page to a next page according to the radian of the arc when a direction that corresponds to the track of the touch operation and is determined by the determining module 202 is a second direction, where the second direction is a direction other than a first direction in a clockwise direction or an anti-clockwise direction.

In addition, in this embodiment of the present disclosure, in a case of multiple pages, for example, for an electronic book (e-book), internal content may be viewed in a page turning manner. Page switching is particularly commonly used in a scenario of a relatively large quantity of pages, and for a single page, page scrolling is performed. Therefore, in this embodiment, practicability and operability of the solution are improved.

Figure 10:
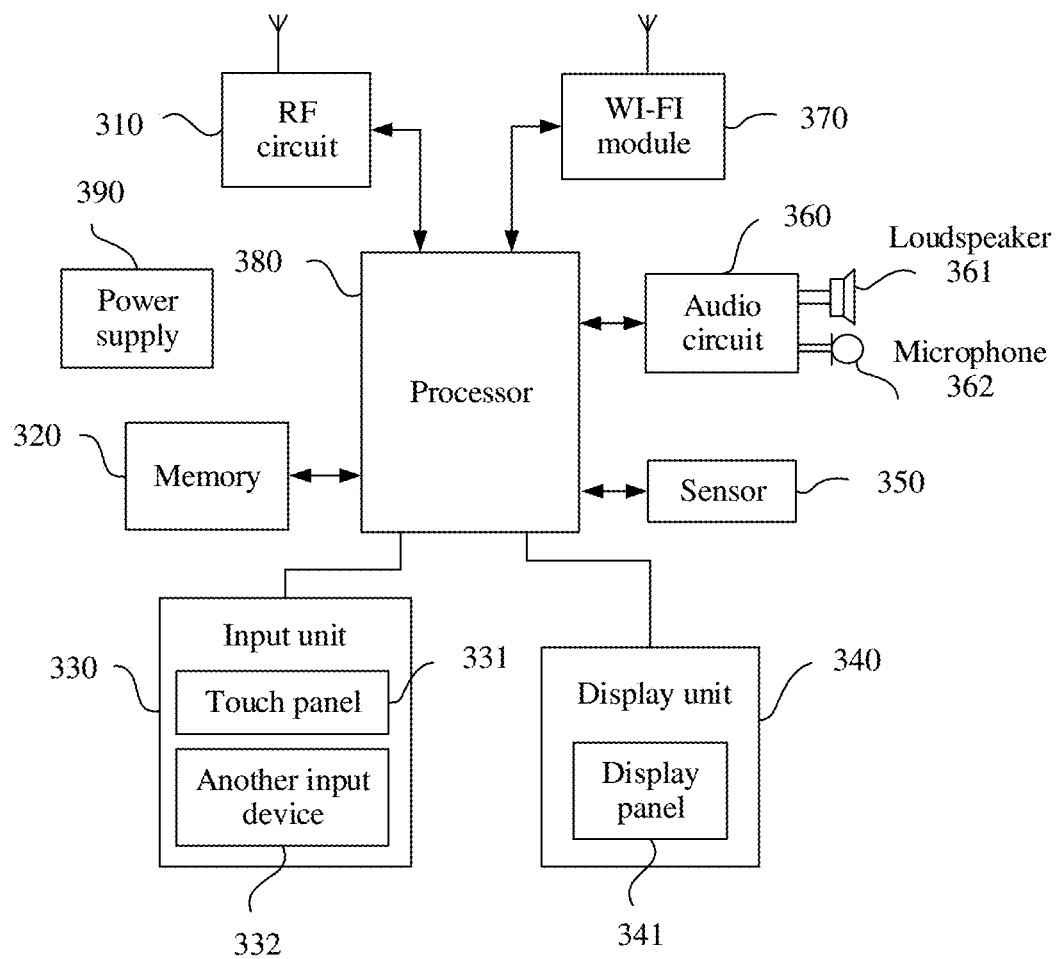
FIG. 10 is a schematic structural diagram of an operation track response apparatus according to an embodiment of the present disclosure.

An embodiment of the present disclosure provides another operation track response apparatus, as shown in FIG. 10. For ease of description, only a part related to this embodiment of the present disclosure is illustrated. For specific technical details that are not disclosed, refer to a method part of an embodiment of the present disclosure. The operation track response apparatus may be any terminal device, including a mobile phone, a tablet computer, a PDA, a point of sales (POS), a vehicle-mounted computer, or the like, and for example, the operation track response apparatus is a mobile phone.

FIG. 10 shows a block diagram of a partial structure of a mobile phone related to the terminal provided in this embodiment of the present disclosure. Referring to FIG. 10, the mobile phone includes parts such as a radio frequency (RF) circuit 310, a memory 320, an input unit 330, a display unit 340, a sensor 350, an audio circuit 360, a WI-FI module 370, a processor 380, and a power supply 390. Persons skilled in the art may understand that the structure of the mobile phone shown in FIG. 10 does not constitute any limitation on the mobile phone, and instead, the mobile phone may include parts more or fewer than those shown in the figure, or a combination of some parts, or parts arranged differently.

The following describes the constituent parts of the mobile phone in detail with reference to FIG. 10.

The RF circuit 310 may be configured to receive and send a signal in an information receiving or sending process or a call process, and in particular, after receiving downlink information of a base station, send the downlink information to the processor 380 for processing, and in addition, send involved uplink data to the base station. Generally, the RF circuit 310 includes but is not limited to an antenna, at least one amplifier, a transceiver, a coupler, a low noise amplifier (LNA), and a duplexer. In addition, the RF circuit 310 may further communicate with a network and another device by means of wireless communication. The foregoing wireless communication may use any communications standard or protocol, which includes but is not limited to a GSM, a general packet radio service (GPRS), CDMA, Wideband CDMA (WCDMA), an LTE, an electronic mail (e-mail), an SMS, and the like.

The memory 320 may be configured to store a software program and a module, and the processor 380 runs the software program and the module that are stored in the memory 320 in order to execute various functions and applications of the mobile phone and perform data processing. The memory 320 may mainly include a program storage area and a data storage area. The program storage area may store an operating system, an application program required by at least one function (such as a voice playing function and an image playing function), and the like. The data storage area may store data (such as audio data and a phone book) created according to use of the mobile phone, and the like. In addition, the memory 320 may include a high-speed random access memory (RAM), and may further include a non-volatile memory, for example, at least one magnetic disk storage component, a flash memory component, or another volatile solid-state storage component.

The input unit 330 may be configured to receive input digital or character information, and generate key signal input related to user setting and function control of the mobile phone. Further, the input unit 330 may include a touch panel 331 and an input device 332. The touch panel 331 is also referred to as a touchscreen and may collect a touch operation (such as an operation performed by a user on the touch panel 331 or near the touch panel 331 using any proper object or accessory, such as a finger or a stylus) on or near the touch panel 331, and drive a corresponding connection apparatus according to a preset program. Optionally, the touch panel 331 may include two parts, a touch detection apparatus and a touch controller. The touch detection apparatus detects a touch location of a user, detects a signal brought by the touch operation, and sends the signal to the touch controller. The touch controller receives touch information from the touch detection apparatus, converts the touch information into touch coordinates, and sends the touch coordinates to the processor 380, and can receive and execute a command sent by the processor 380. In addition, the touch panel 331 may be implemented using multiple types such as a resistive type, a capacitive type, an infrared ray, and a surface acoustic wave. The input unit 330 may include the input device 332 in addition to the touch panel 331. Further, the input device 332 may include but is not limited to one or more of a physical keyboard, a function key (such as a volume control key or an on/off key), a trackball, a mouse, an operating lever, and the like.

The display unit 340 may be configured to display information entered by the user or information provided for the user, and various menus of the mobile phone. The display unit 340 may include a display panel 341. Optionally, a form such as a liquid crystal display (LCD) and an organic light-emitting diode (OLED) may be used to configure the display panel 341. Further, the touch panel 331 may cover the display panel 341. When detecting a touch operation on or near the touch panel 331, the touch panel 331 transmits the touch operation to the processor 380 to determine a type of a touch event, and then the processor 380 provides corresponding visual output on the display panel 341 according to the type of the touch event. In FIG. 10, the touch panel 331 and the display panel 341 are used as two independent parts to implement input and output functions of the mobile phone. However, in some embodiments, the touch panel 331 and the display panel 341 may be integrated to implement the input and output functions of the mobile phone.

The mobile phone may further include at least one sensor 350, such as an optical sensor, a motion sensor, or another sensor. Further, the light sensor may include an ambient light sensor and a proximity sensor. The ambient light sensor may adjust luminance of the display panel 341 according to brightness of ambient light, and the proximity sensor may turn off the display panel 341 and/or backlight when the mobile phone moves to an ear. As one type of a motion sensor, an accelerometer sensor may detect a value of acceleration in each direction (generally, three axes), while at rest, may detect a value and a direction of gravity, and may be used in an application that recognizes a mobile phone posture (such as screen switching between portrait and landscape modes, a related game, and magnetometer posture calibration), a function related to vibration recognition (such as a pedometer and knocking), and the like. For another sensor that may be arranged on the mobile phone, such as a gyroscope, a barometer, a hygrometer, a thermometer, or an infrared ray sensor, no further details are provided herein.

The audio circuit 360, a loudspeaker 361, and a microphone 362 may provide an audio interface between the user and the mobile phone. The audio circuit 360 may transmit, to the loudspeaker 361, an electrical signal converted from received audio data, and the loudspeaker 361 converts the electrical signal to a sound signal for output. The microphone 362 converts a collected sound signal into an electrical signal, and the audio circuit 360 converts the electrical signal into audio data upon receipt of the electrical signal and outputs the audio data to the processor 380 for processing, and then the audio data is sent to, for example, another mobile phone, using the RF circuit 310, or the audio data is output to the memory 320 for further processing.

WI-FI belongs to a short-distance wireless transmission technology. The mobile phone may help, using the WI-FI module 370, the user to send and receive an e-mail, browse a web page, access streaming media, and the like. The WI-FI module 370 provides wireless broadband Internet access for the user. Although FIG. 10 shows the WI-FI module 370, it may be understood that the WI-FI module is not a mandatory part of the mobile phone, and may completely be omitted as required without changing a scope of the essence of the present disclosure.

The processor 380 is a control center of the mobile phone and is connected to each part of the entire mobile phone using various interfaces and lines, and performs, by running or executing the software program and/or module that are stored in the memory 320 and invoking data stored in the memory 320, various functions of the mobile phone and data processing in order to perform overall monitoring on the mobile phone. Optionally, the processor 380 may include one or more processing units. Preferably, an application processor and a modem processor may be integrated into the processor 380. The application processor mainly processes an operating system, a user interface, an application program, and the like, and the modem processor mainly processes wireless communication. It may be understood that the foregoing modem processor may not be integrated into the processor 380.

The mobile phone further includes the power supply 390 (such as a battery) that supplies power to each part. Preferably, the power supply 390 may be logically connected to the processor 380 using a power management system such that functions such as management of charging, discharging, and power consumption are implemented using the power supply management system.

Though not shown, the mobile phone may further include a camera, a BLUETOOTH module, and the like, which are not described herein.

In this embodiment of the present disclosure, the processor 380 included in the terminal has the following functions of detecting a touch operation triggered by a user on a current display interface, determining a radian of an arc if it is detected that a track of the touch operation is the arc, and adjusting, according to the radian of the arc, content presented on the current display interface, where different radians correspond to adjustment of different degrees.

The processor 380 further has the following function of adjusting a current playing progress of the video or audio according to the radian of the arc when the content presented on the current display interface is a video or audio that is being played, where the playing progress includes fast-forward playing and rewind playing, and a larger radian leads to a larger degree of fast-forward or rewind.

The processor 380 further has the following functions when a progress bar of the audio or video includes multiple preset playing points, and in the progress bar, a playing point closer to a playing end position corresponds to a playing time with a longer distance from a playing start position, determining a target playing point according to the radian of the arc and a preset correspondence between a radian and a playing point, and starting to play the audio or video from the target playing point, where the target playing point is one of the multiple preset playing points, and in the progress bar, a playing point closer to the playing end position corresponds to a larger radian.

The processor 380 further has the following function of zooming in on the single picture according to the radian of the arc, when the content presented on the current display interface is a single picture, when a direction corresponding to the track of the touch operation is a first direction or zooming out on the single picture according to the radian of the arc when a direction corresponding to the track of the touch operation is a second direction, where the first direction is one of a clockwise direction or an anti-clockwise direction, and the second direction is the other of the clockwise direction or the anti-clockwise direction.

The processor 380 further has the following functions when the single picture includes multiple preset zoom points, and different zoom points correspond to different zoom percentages, determining a target zoom point according to the radian of the arc and a preset correspondence between a radian and a zoom point, and starting to zoom out on or zoom in on the corresponding zoom picture from the target zoom point, where the target zoom point is one of the multiple preset zoom points, and a larger radian of the arc corresponds to a larger zoom-out or zoom-in percentage of the picture.

The processor 380 further has the following function when the content presented on the current display interface is one of multiple pictures, switching the current picture to a previous picture according to the radian of the arc, where the first direction is a clockwise direction or an anti-clockwise direction when a direction corresponding to the track of the touch operation is a first direction, or switching the current picture to a next picture according to the radian of the arc when a direction corresponding to the track of the touch operation is a second direction, where the second direction is a direction other than a first direction in a clockwise direction or an anti-clockwise direction.

The processor 380 further has the following functions of determining, according to the radian of the arc and a preset correspondence between a radian and a quantity of switched pictures, a target display picture obtained by switching, and displaying the target display picture in the multiple pictures when the content presented on the current display interface is one of multiple pictures, where the target display picture is one of the multiple pictures, and a larger radian of the arc leads to a larger quantity of switched pictures.

The processor 380 further has the following function when the content presented on the current display interface is multiple levels of folders, switching a current folder to a previous-level folder according to the radian of the arc when a direction corresponding to the track of the touch operation is a first direction, where the first direction is a clockwise direction or an anti-clockwise direction, and in the multiple folders, a folder closer to a root directory corresponds to a larger radian of the arc.

The processor 380 further has the following function when the content presented on the current display interface is a single page, scrolling down the page according to the radian of the arc when a direction corresponding to the track of the touch operation is a first direction, where the first direction is a clockwise direction or an anti-clockwise direction, and in the page, a position closer to the bottom of the page corresponds to a larger radian of the arc, or scrolling up the page according to the radian of the arc when a direction corresponding to the track of the touch operation is a second direction, where the second direction is a direction other than a first direction in a clockwise direction or an anti-clockwise direction.

The processor 380 further has the following function when the content presented on the current display interface is multiple pages, switching a current page to a previous page according to the radian of the arc when a direction corresponding to the track of the touch operation is a first direction, where the first direction is a clockwise direction or an anti-clockwise direction, and a larger radian of the arc leads to a larger quantity of switched pages, or switching a current page to a next page according to the radian of the arc when a direction corresponding to the track of the touch operation is a second direction, where the second direction is a direction other than a first direction in a clockwise direction or an anti-clockwise direction.

The processor 380 further has the following function in a date-time setting scenario, adjusting date-time forwards when an arc is obtained by sliding clockwise on a touchscreen, or adjusting date-time backwards when an arc is obtained by sliding in an anti-clockwise direction, where operations corresponding to the clockwise sliding and the anti-clockwise sliding may also include adjusting the date-time backwards when an arc is obtained by sliding clockwise on the touchscreen or adjusting the date-time forwards when an arc is obtained by sliding in an anti-clockwise direction.

The processor 380 is further configured to perform in a date-time setting scenario, when an angular velocity of an arc corresponding to the operation track of the user is relatively quick, quickening an operation speed of forward adjustment or an operation speed of backward adjustment, or when an angular velocity of an arc corresponding to the operation track of the user is relatively slow, slowing down an operation speed of forward adjustment or an operation speed of backward adjustment.

The processor 380 is further configured to perform entering a fine adjustment mode according to duration of a pause of a finger of the user on the touchscreen. Focuses of detailed adjustment are sequentially downgraded, that is, year, month, day, hour, minute, second are sequentially focused on, and a second-based adjustment mode is finally entered. When the finger departs, the fine adjustment mode is disabled.

The processor 380 is further configured to perform in a volume adjustment scenario, when sliding clockwise on the touchscreen, the user may turn up volume, and when sliding anti-clockwise on the touchscreen, may turn down the volume.

In this embodiment of the present disclosure, an operation track response method is provided. An operation track response apparatus detects a touch operation triggered by a user on a current display interface, determines a radian of an arc if detecting that a track of the touch operation is the arc, and adjusts, according to the radian of the arc, content presented on the current display interface, where different radians correspond to adjustment of different degrees. The touch operation triggered by the user is responded to using the foregoing method, and media can still be controlled when an operating area is relatively small. This method is applicable to a touchscreen device with a small screen, has an extremely wide application scenario, and does not need assistance from a physical button, thereby improving practicability of the solution.

Figure 11:
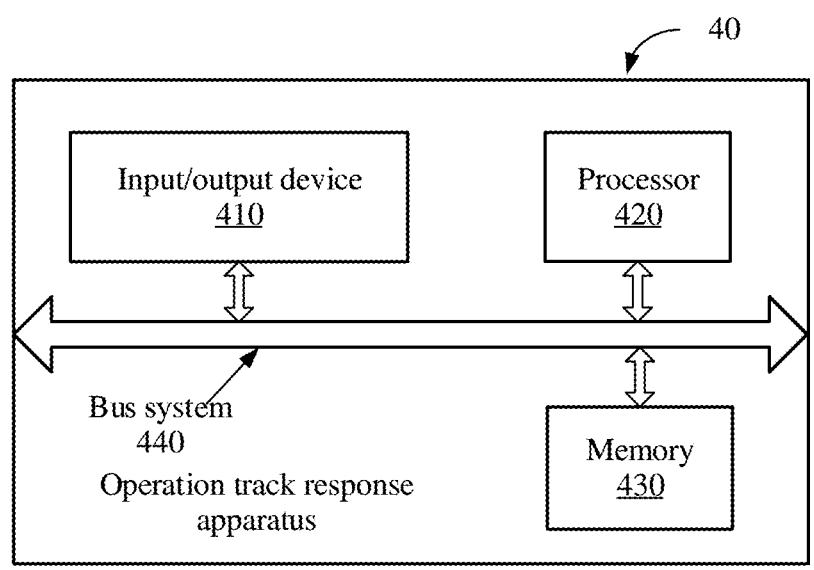
FIG. 11 is another schematic structural diagram of an operation track response apparatus according to an embodiment of the present disclosure.

FIG. 11 is a schematic structural diagram of an operation track response apparatus 40 according to an embodiment of the present disclosure. The operation track response apparatus 40 may include an input/output device 410, a processor 420, and a memory 430. An output device in this embodiment of the present disclosure may be a display device.

The memory 430 may include a read-only memory (ROM) and a RAM, and provides an instruction and data for the processor 420. A part of the memory 430 may further include a non-volatile RAM (NVRAM).

The memory 430 stores the following elements: an executable module or a data structure, a subset of an executable module or a data structure, or an extension set of an executable module or a data structure.

Operation instructions include various operation instructions, and are used to implement various operations.

An operating system includes various system programs, and is used to implement various basic services and process hardware-based tasks.

The processor 420 in this embodiment of the present disclosure is configured to detect a touch operation triggered by a user on a current display interface, if it is detected that a track of the touch operation is an arc, determine a radian of the arc, and adjust, according to the radian of the arc, content presented on the current display interface, where different radians correspond to adjustment of different degrees.

The processor 420 controls an operation of the operation track response apparatus 40, and the processor 420 may also be referred to as a central processing unit (CPU). In specific application, all components of the operation track response apparatus 40 are coupled together using a bus system 440. The bus system 440 may include a power supply bus, a control bus, a status signal bus, and the like in addition to a data bus. However, for clear description, various buses in the figure are marked as the bus system 440.

The methods disclosed in the foregoing embodiments of the present disclosure may be applied to the processor 420, or implemented by the processor 420. The processor 420 may be an integrated circuit chip and has a signal processing capability. In an implementation process, the steps in the foregoing methods may be completed by means of an integrated logic circuit of hardware in the processor 420 or an instruction in a form of software. The foregoing processor 420 may be a general purpose processor, a digital signal processor (DSP), an application specific integrated circuit (ASIC), a field-programmable gate array (FPGA), or another programmable logical device, discrete gate or transistor logical device, or discrete hardware component. The processor 420 may implement or perform the methods, the steps, and logical block diagrams disclosed in the embodiments of the present disclosure. The general-purpose processor may be a microprocessor or the processor may be any conventional processor, or the like. The steps of the methods disclosed with reference to the embodiments of the present disclosure may be directly executed and completed by a hardware decoding processor, or executed and completed by a combination of hardware and software modules in a decoding processor. The software module may be located in a mature storage medium in the field, such as a RAM, a flash memory, a ROM, a programmable ROM (PROM), an electrically erasable PROM (EEPROM), or a register. The storage medium is located in the memory 430. The processor 420 reads information from the memory 430 and completes the steps in the foregoing methods in combination with the hardware of the processor 420.

Optionally, the processor 420 is further configured to adjust a current playing progress of the video or audio according to the radian of the arc when the content presented on the current display interface is a video or audio that is being played, where the playing progress includes fast-forward playing and rewind playing, and a larger radian leads to a larger degree of fast-forward or rewind.

Optionally, the processor 420 is further configured to, when a progress bar of the audio or video includes multiple preset playing points, and in the progress bar, a playing point closer to a playing end position corresponds to a playing time with a longer distance from a playing start position, determine a target playing point according to the radian of the arc and a preset correspondence between a radian and a playing point, and start to play the audio or video from the target playing point, where the target playing point is one of the multiple preset playing points, and in the progress bar, a playing point closer to the playing end position corresponds to a larger radian.

Optionally, the processor 420 is further configured to, when the content presented on the current display interface is a single picture, when a direction corresponding to the track of the touch operation is a first direction, zoom in on the single picture according to the radian of the arc, or when the content presented on the current display interface is a single picture, when a direction corresponding to the track of the touch operation is a second direction, zoom out on the single picture according to the radian of the arc, where the first direction is one of a clockwise direction or an anti-clockwise direction, and the second direction is the other of the clockwise direction or the anti-clockwise direction.

Optionally, the processor 420 is further configured to, when the single picture includes multiple preset zoom points, and different zoom points correspond to different zoom percentages, determine a target zoom point according to the radian of the arc and a preset correspondence between a radian and a zoom point, and start to zoom out on or zoom in on the corresponding zoom picture from the target zoom point, where the target zoom point is one of the multiple preset zoom points, and a larger radian of the arc corresponds to a larger zoom-out or zoom-in percentage of the picture.

Optionally, the processor 420 is further configured to, when the content presented on the current display interface is one of multiple pictures, when a direction corresponding to the track of the touch operation is a first direction, switch the current picture to a previous picture according to the radian of the arc, where the first direction is a clockwise direction or an anti-clockwise direction, or when the content presented on the current display interface is one of multiple pictures, when a direction corresponding to the track of the touch operation is a second direction, switch the current picture to a next picture according to the radian of the arc, where the second direction is a direction other than a first direction in a clockwise direction or an anti-clockwise direction.

Optionally, the processor 420 is further configured to, when the content presented on the current display interface is one of multiple pictures, determine, according to the radian of the arc and a preset correspondence between a radian and a quantity of switched pictures, a target display picture obtained by switching, and display the target display picture in the multiple pictures, where the target display picture is one of the multiple pictures, and a larger radian of the arc leads to a larger quantity of switched pictures.

Optionally, the processor 420 is further configured to, when the content presented on the current display interface is multiple levels of folders, when a direction corresponding to the track of the touch operation is a first direction, switch a current folder to a previous-level folder according to the radian of the arc, where the first direction is a clockwise direction or an anti-clockwise direction, and in the multiple folders, a folder closer to a root directory corresponds to a larger radian of the arc.

Optionally, the processor 420 is further configured to, when the content presented on the current display interface is a single page, when a direction corresponding to the track of the touch operation is a first direction, scroll down the page according to the radian of the arc, where the first direction is a clockwise direction or an anti-clockwise direction, and in the page, a position closer to the bottom of the page corresponds to a larger radian of the arc, or when the content presented on the current display interface is a single page, when a direction corresponding to the track of the touch operation is a second direction, scroll up the page according to the radian of the arc, where the second direction is a direction other than a first direction in a clockwise direction or an anti-clockwise direction.

Optionally, the processor 420 is further configured to when the content presented on the current display interface is multiple pages, when a direction corresponding to the track of the touch operation is a first direction, switch a current page to a previous page according to the radian of the arc, where the first direction is a clockwise direction or an anti-clockwise direction, and a larger radian of the arc leads to a larger quantity of switched pages, or when the content presented on the current display interface is multiple pages, when a direction corresponding to the track of the touch operation is a second direction, switch a current page to a next page according to the radian of the arc, where the second direction is a direction other than a first direction in a clockwise direction or an anti-clockwise direction.

Optionally, the processor 420 is configured to control the input/output device 410 to receive the touch operation triggered by the user on the current display interface.

Related descriptions of FIG. 11 may be understood with reference to related descriptions and effects of a method part in FIG. 1, and details are not described herein.

In this embodiment of the present disclosure, an operation track response method is provided. An operation track response apparatus detects a touch operation triggered by a user on a current display interface, determines a radian of an arc if detecting that a track of the touch operation is the arc, and adjusts, according to the radian of the arc, content presented on the current display interface, where different radians correspond to adjustment of different degrees. The touch operation triggered by the user is responded to using the foregoing method, and media can still be controlled when an operating area is relatively small. This method is applicable to a touchscreen device with a small screen, has an extremely wide application scenario, and does not need assistance from a physical button, thereby improving practicability of the solution.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The software product is stored in a storage medium and includes several instructions for instructing a computer device (which may be a PC, a server, or a network device) to perform all or some of the steps of the methods described in the embodiments of the present disclosure. The foregoing storage medium includes any medium that can store program code, such as a universal serial bus (USB) flash drive, a ROM, a RAM, a magnetic disk, or an optical disc.

The foregoing embodiments are only intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An operation track response method, comprising:
   detecting a touch operation triggered by a user on a current display interface, wherein a track of the touch operation comprises an arc;
   determining a radian of the arc and an angular velocity of the track of the touch operation;
   determining a preset correspondence between the radian of the arc, the angular velocity of the track of the touch operation, and an amount by which to adjust content presented on the current display; and
   adjusting the content presented on the current display interface by the amount according to the radian of the arc and the angular velocity of the track of the touch operation, wherein different radians correspond to adjustment of different degrees.

2. The method according to claim 1, wherein the content presented on the current display interface comprises a video or audio that is being played, wherein adjusting the content presented on the current display interface comprises adjusting a current playing progress of the video or the audio according to the radian of the arc, wherein the playing progress comprises fast-forward playing and rewind playing, and wherein a larger radian leads to a larger degree of fast-forward or rewind.

3. The method according to claim 2, wherein a progress bar of the audio or the video comprises a plurality of preset playing points, wherein in the progress bar, a playing point closer to a playing end position corresponds to a playing time with a longer distance from a playing start position, and wherein adjusting the current playing progress of the video or the audio comprises:
   determining a target playing point according to the radian of the arc and a preset correspondence between a radian and a playing point; and
   starting to play the audio or the video from the target playing point,
   wherein the target playing point comprises one of the plurality of preset playing points, and
   wherein in the progress bar, the playing point closer to the playing end position corresponds to the larger radian.

4. The method according to claim 1, wherein the content presented on the current display interface comprises a single picture, and wherein adjusting the content presented on the current display interface comprises:
zooming in on the single picture according to the radian of the arc in response to a direction corresponding to the track of the touch operation comprising a first direction; and
zooming out on the single picture according to the radian of the arc in response to the direction corresponding to the track of the touch operation comprising a second direction,
wherein the first direction comprises one of a clockwise direction or an anti-clockwise direction, and
wherein the second direction comprises the other of the clockwise direction or the anti-clockwise direction.

5. The method according to claim 4, wherein adjusting the content presented on the current display interface comprises performing a zoom-out or a zoom-in operation on the single picture according to the radian of the arc and a preset correspondence between a radian and a zoom percentage of the single picture, and wherein a larger radian of the arc corresponds to a smaller zoom-out percentage or a larger zoom-in percentage of the single picture.

6. The method according to claim 1, wherein the content presented on the current display interface comprises one of a plurality of pictures, and wherein adjusting the content presented on the current display interface comprises:
switching a current picture to a previous picture according to the radian of the arc based on a first direction corresponding to the track of the touch operation, wherein the first direction comprises a clockwise direction or an anti-clockwise direction; and
switching the current picture to a next picture according to the radian of the arc based on a second direction corresponding to the track of the touch operation, wherein the second direction comprises a direction other than the first direction in the clockwise direction or the anti-clockwise direction.

7. The method according to claim 1, wherein the content presented on the current display interface comprises one of a plurality of pictures, and wherein adjusting the content presented on the current display interface comprises:
determining, according to the radian of the arc and a preset correspondence between a radian and a quantity of switched pictures, a target display picture obtained by switching; and
displaying the target display picture in the plurality of pictures, wherein the target display picture comprises one of the plurality of pictures, and wherein a larger radian of the arc leads to a larger quantity of switched pictures.

8. The method according to claim 1, wherein the content presented on the current display interface comprises a plurality of levels of folders, wherein adjusting the content presented on the current display interface comprises switching a current folder to a previous-level folder according to the radian of the arc based on a direction corresponding to the track of the touch operation, wherein the direction comprises a clockwise direction or an anti-clockwise direction, and wherein in the plurality of levels of folders, a folder closer to a root directory corresponds to a larger radian of the arc.

9. The method according to claim 1, wherein the content presented on the current display interface comprises a single page, and wherein adjusting the content presented on the current display interface comprises:
scrolling down the single page according to the radian of the arc based on a first direction corresponding to the track of the touch operation, wherein the first direction comprises a clockwise direction or an anti-clockwise direction, and wherein in the single page, a position closer to a bottom of the single page corresponds to a larger radian of the arc; and
scrolling up the single page according to the radian of the arc based on a second direction corresponding to the track of the touch operation, and wherein the second direction comprises a direction other than the first direction in the clockwise direction or the anti-clockwise direction.

10. The method according to claim 1, wherein the content presented on the current display interface comprises a plurality of pages, and wherein adjusting the content presented on the current display interface comprises:
switching a current page to a previous page according to the radian of the arc based on a first direction corresponding to the track of the touch operation, wherein the first direction comprises a clockwise direction or an anti-clockwise direction, and wherein a larger radian of the arc leads to a larger quantity of switched pages; and
switching the current page to a next page according to the radian of the arc based on a second direction corresponding to the track of the touch operation, wherein the second direction comprises a direction other than the first direction in the clockwise direction or the anti-clockwise direction.

11. An operation track response apparatus, comprising:
a memory comprising instructions; and
a processor coupled to the memory, wherein the instructions cause the processor to be configured to:
detect a touch operation triggered by a user on a current display interface, wherein a track of the touch operation comprises an arc;
determine a radian of the arc and an angular velocity of the track of the touch operation;
determine a preset correspondence between the radian of the arc, the angular velocity of the track of the touch operation, and an amount by which to adjust content presented on the current display; and
adjust the content presented on the current display interface by the amount according to the radian of the arc and the angular velocity of the track of the touch operation, wherein different radians correspond to adjustment of different degrees.

12. The operation track response apparatus according to claim 11, wherein the content presented on the current display interface comprises a video or audio that is being played, wherein the instructions further cause the processor to be configured to adjust a current playing progress of the video or the audio according to the radian of the arc, wherein the playing progress comprises fast-forward playing and rewind playing, and wherein a larger radian leads to a larger degree of fast-forward or rewind.

13. The operation track response apparatus according to claim 12, wherein a progress bar of the audio or the video comprises a plurality of preset playing points, wherein in the progress bar, a playing point closer to a playing end position corresponds to a playing time with a longer distance from a playing start position, and wherein the instructions further cause the processor to be configured to:
determine a target playing point according to the radian of the arc and a preset correspondence between a radian and a playing point; and
start to play the audio or the video from the target playing point, wherein the target playing point comprises one of the plurality of preset playing points, and wherein in the progress bar, the playing point closer to the playing end position corresponds to the larger radian.

14. The operation track response apparatus according to claim 11, wherein the content presented on the current display interface comprises a single picture, and wherein the instructions further cause the processor to be configured to:

zoom in on the single picture according to the radian of the arc in response to a direction corresponding to the track of the touch operation comprising a first direction; and zoom out on the single picture according to the radian of the arc in response to the direction corresponding to the track of the touch operation comprising a second direction, wherein the first direction comprises one of a clockwise direction or an anti-clockwise direction, and wherein the second direction comprises the other of the clockwise direction or the anti-clockwise direction.

15. The operation track response apparatus according to claim 14, wherein the single picture comprises a plurality of preset zoom points, wherein different zoom points correspond to different zoom percentages, and wherein the instructions further cause the processor to be configured to:

determine a target zoom point according to the radian of the arc and a preset correspondence between a radian and a zoom point; and start to zoom out on or zoom in on the single picture from the target zoom point, wherein the target zoom point comprises one of the plurality of preset zoom points, and wherein a larger radian of the arc corresponds to a larger zoom-out or zoom-in percentage of the single picture.

16. The operation track response apparatus according to claim 11, wherein the content presented on the current display interface comprises one of a plurality of pictures, and wherein the instructions further cause the processor to be configured to:

switch a current picture to a previous picture according to the radian of the arc based on a first direction corresponding to the track of the touch operation, wherein the first direction comprises a clockwise direction or an anti-clockwise direction; and switch the current picture to a next picture according to the radian of the arc based on a second direction corresponding to the track of the touch operation, wherein the second direction comprises a direction other than the first direction in the clockwise direction or the anti-clockwise direction.

17. The operation track response apparatus according to claim 11, wherein the content presented on the current display interface comprises one of a plurality of pictures, and wherein the instructions further cause the processor to be configured to:

determine, according to the radian of the arc and a preset correspondence between a radian and a quantity of switched pictures, a target display picture obtained by switching; and display the target display picture in the plurality of pictures, wherein the target display picture comprises one of the plurality of pictures, and wherein a larger radian of the arc leads to a larger quantity of switched pictures.

18. The operation track response apparatus according to claim 11, wherein the content presented on the current display interface comprises a plurality of levels of folders, wherein the instructions further cause the processor to be configured to switch a current folder to a previous-level folder according to the radian of the arc based on a direction corresponding to the track of the touch operation, wherein the direction comprises a clockwise direction or an anti-clockwise direction, and wherein in the plurality of levels of folders, a folder closer to a root directory corresponds to a larger radian of the arc.

19. The operation track response apparatus according to claim 11, wherein the content presented on the current display interface comprises a single page, wherein the instructions further cause the processor to be configured to:

scroll down the single page according to the radian of the arc based on a first direction corresponding to the track of the touch operation, wherein the first direction comprises a clockwise direction or an anti-clockwise direction, and wherein in the single page, a position closer to a bottom of the single page corresponds to a larger radian of the arc; and scroll up the single page according to the radian of the arc based on a second direction corresponding to the track of the touch operation, wherein the second direction comprises a direction other than the first direction in the clockwise direction or the anti-clockwise direction.

20. The operation track response apparatus according to claim 11, wherein the content presented on the current display interface comprises a plurality of pages, and wherein the instructions further cause the processor to be configured to:

switch a current page to a previous page according to the radian of the arc based on a first direction corresponding to the track of the touch operation, wherein the first direction comprises a clockwise direction or an anti-clockwise direction, and wherein a larger radian of the arc leads to a larger quantity of switched pages; and switch the current page to a next page according to the radian of the arc based on a second direction corresponding to the track of the touch operation, wherein the second direction comprises a direction other than the first direction in the clockwise direction or the anti-clockwise direction.

21. An operation track response apparatus, comprising:
a memory configured to store a program;
an input/output device;
a processor, and
a bus system coupling the memory, the input/output device,
wherein when executed, the program causes the processor to be configured to:
detect a touch operation triggered by a user on a current display interface, wherein a track of the touch operation comprises an arc;
determine a radian of the arc and an angular velocity of the track of the touch operation;
determine a preset correspondence between the radian of the arc, the angular velocity of the track of the touch operation, and an amount by which to adjust content presented on the current display; and
adjust the content presented on the current display interface by the amount according to the radian of the arc and the angular velocity of the track of the touch operation, wherein different radians correspond to adjustment of different degrees.

* * * * *